(12) United States Patent
Burke et al.

(10) Patent No.: US 12,044,403 B2
(45) Date of Patent: Jul. 23, 2024

(54) HAND TORCH, BASE, AND REGULATOR SYSTEM

(71) Applicant: Worthington Cylinders Corporation, Columbus, OH (US)

(72) Inventors: John Burke, Williamsburg, OH (US); Christopher Francis Kreuser, Lewis Center, OH (US); Dustin Lee, Worthington, OH (US); Jerome Schafer, Liberty Township, OH (US); Jake Schubert, Bellevue, KY (US); Michael Sharpe, Sunbury, OH (US); Cory Blaine Shoup, Powell, OH (US); Karl Vanderbeek, Cincinnati, OH (US); Thomas Washenko, Columbus, OH (US)

(73) Assignee: Worthington Cylinders Corporation, Columbus, OH (US)

( * ) Notice: Subject to any disclaimer, the term of this patent is extended or adjusted under 35 U.S.C. 154(b) by 222 days.

(21) Appl. No.: 17/134,971

(22) Filed: Dec. 28, 2020

(65) Prior Publication Data
US 2021/0278079 A1    Sep. 9, 2021

Related U.S. Application Data

(60) Provisional application No. 62/987,065, filed on Mar. 9, 2020.

(51) Int. Cl.
*F23D 14/38* (2006.01)
*F23D 14/28* (2006.01)
(Continued)

(52) U.S. Cl.
CPC ............. *F23D 14/38* (2013.01); *F23D 14/28* (2013.01); *F23D 14/52* (2013.01);
(Continued)

(58) Field of Classification Search
CPC .. B23K 5/22; B23K 7/10; F23D 14/28; F23D 14/38; F23D 14/40; F23D 14/52;
(Continued)

(56) References Cited

U.S. PATENT DOCUMENTS 1,808,968 A * 6/1931 Plumley .................. F23D 14/42
    266/904
2,666,479 A * 1/1954 Clinton, Jr. ........... F23D 14/465
    251/243
(Continued)

FOREIGN PATENT DOCUMENTS

CN        3097501        1/1999
CN        303984932      12/2016
(Continued)

OTHER PUBLICATIONS

Search Report for Taiwan Design No. 109305021; Apr. 6, 2021; 4 pages.

*Primary Examiner* — Jorge A Pereiro
*Assistant Examiner* — Logan P Jones
(74) *Attorney, Agent, or Firm* — TUCKER ELLIS LLP

(57) ABSTRACT

Provided is a torch including a body having a first portion and a second portion angled relative to the first portion, a control knob at a top of the second portion for adjusting a flow of fuel through the torch, a trigger at a top of the first portion that is movable from an off position to an on position to at actuate an igniter, and a burn tube extending from an end of the second portion away from the first and second portions.

17 Claims, 30 Drawing Sheets

(51) Int. Cl.
  *F23D 14/40* (2006.01)
  *F23D 14/52* (2006.01)
  *F23D 14/54* (2006.01)
  *B23K 5/22* (2006.01)
  *B23K 7/10* (2006.01)

(52) U.S. Cl.
  CPC .... *F23D 2200/00* (2013.01); *F23D 2203/007* (2013.01); *F23D 2208/00* (2013.01); *F23D 2212/10* (2013.01); *F23D 2900/31019* (2021.05)

(58) Field of Classification Search
  CPC ............ F23D 14/54; F23D 2200/00; F23D 2203/007; F23D 2207/00; F23D 2208/00; F23D 2212/10; F23D 2900/31019
  See application file for complete search history.

(56) References Cited

U.S. PATENT DOCUMENTS

| | | | |
|---|---|---|---|
| 2,893,420 A * | 7/1959 | Steventon | F23D 14/42 74/519 |
| 4,486,044 A | 12/1984 | Gordon et al. | |
| D290,221 S | 6/1987 | Wilson | |
| D308,160 S | 5/1990 | Sweeny | |
| D335,676 S | 5/1993 | Szybura | |
| 5,313,931 A * | 5/1994 | Coulcher, Jr. | B44D 3/162 431/255 |
| 5,460,520 A * | 10/1995 | Lin | F23D 14/28 431/255 |
| 5,929,386 A * | 7/1999 | Hornick | H01R 13/562 174/135 |
| D413,502 S | 9/1999 | Chang | |
| D415,854 S | 10/1999 | Marcus | |
| D479,439 S | 9/2003 | Joss | |
| D487,687 S | 3/2004 | Shields | |
| D513,346 S | 12/2005 | Buck | |
| D520,446 S | 5/2006 | Liu | |
| D525,583 S | 7/2006 | Vu | |
| D560,311 S | 1/2008 | Li | |
| D594,046 S | 6/2009 | Kita | |
| D594,300 S | 6/2009 | Picaza Ibarrondo | |
| D771,727 S | 11/2016 | Imi | |
| D855,564 S | 7/2019 | Brennan | |
| D873,831 S | 1/2020 | Depaolo | |
| 2005/0168002 A1 | 8/2005 | Herring | |
| 2010/0294821 A1 | 11/2010 | Szabo | |
| 2012/0074244 A1 | 3/2012 | Burdsall et al. | |
| 2016/0047543 A1 * | 2/2016 | Tsai | F23D 14/64 431/153 |
| 2016/0178085 A1 | 6/2016 | Williams et al. | |
| 2020/0149740 A1 * | 5/2020 | Tsai | F23D 14/08 |

FOREIGN PATENT DOCUMENTS

| | | | |
|---|---|---|---|
| DE | 3706681 A1 * | 9/1988 | |
| DE | 202006017683 U1 * | 5/2008 | ............ B25D 16/00 |
| EP | 0583941 | 2/1994 | |
| GB | 1157067 A * | 7/1969 | |

* cited by examiner

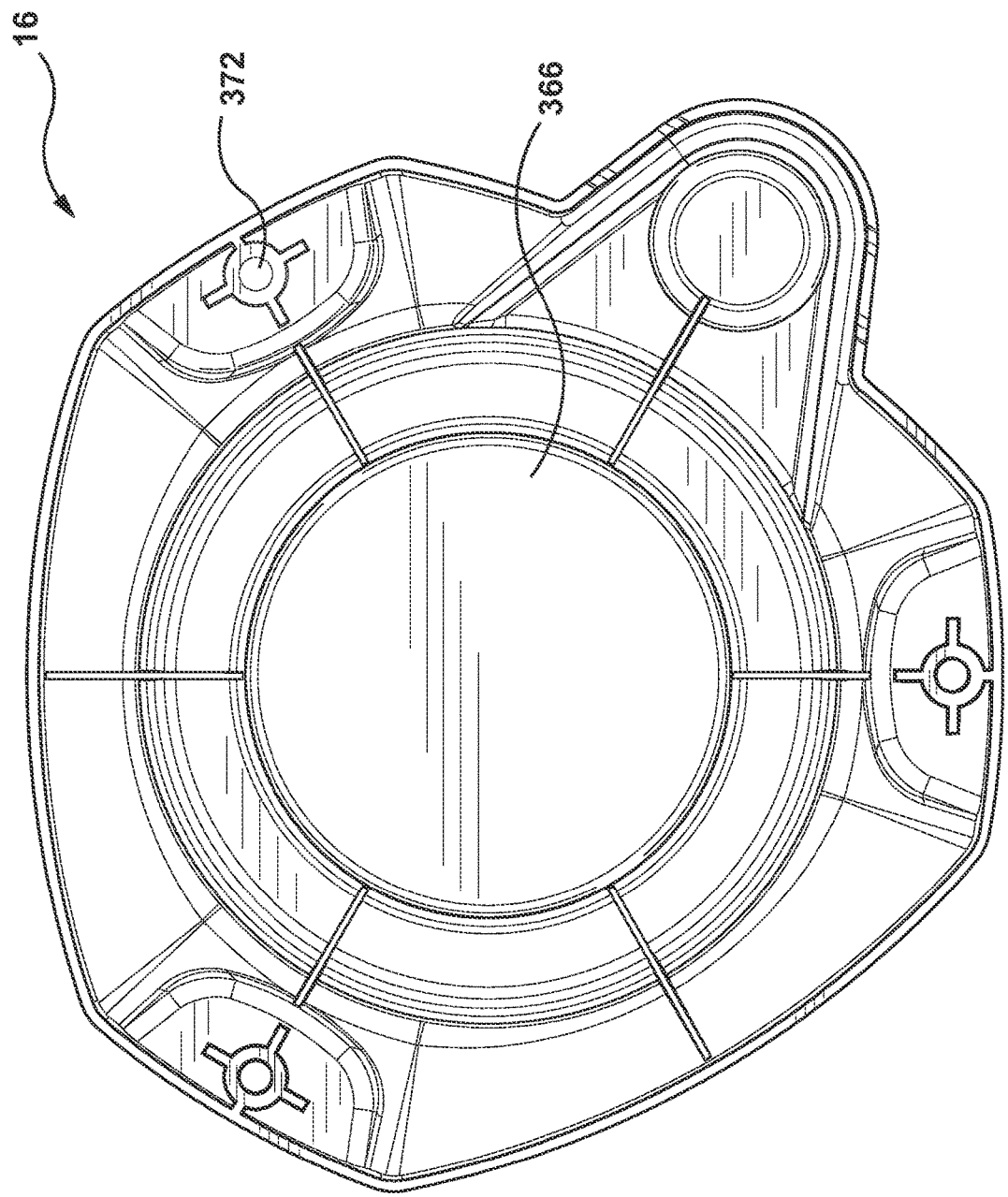

US 12,044,403 B2

HAND TORCH, BASE, AND REGULATOR SYSTEM

This application claims priority to and the benefit of U.S. Provisional Application Ser. No. 62/987,065 filed on Mar. 9, 2020. The entirety of such application is incorporated herein by reference.

TECHNICAL FIELD

In general, the present invention relates to a torch system, and in particular to a torch system including a torch designed for one-handed use.

BACKGROUND OF THE INVENTION

Torches are used in various applications for applying localized intense heat. Torches can be used with a number of fuels, such as propane, and may be self-igniting by generating a spark using an igniter. Self-igniting torches typically include a trigger or push button ignition that when depressed activates the igniter to create a spark that ignites the fuel in the burn tube. Activation of the trigger may also release a flow of fuel under pressure into a burn tube or the release of fuel may be controlled by a separate control. The ignited fuel creates a flame at the end of the burn tube that can be used in a variety of applications. Such torches may be used for heating, brazing, welding and the like.

SUMMARY OF THE INVENTION

In accordance with an embodiment of the present invention, a torch is provided that includes a body having a first portion and a second portion angled relative to the first portion, a control knob at a top of the second portion for adjusting a flow of fuel through the torch, a trigger at a top of the first portion that is movable from an off position to an on position to at actuate an igniter, and a burn tube extending from an end of the second portion away from the first and second portions.

In accordance with another embodiment of the present invention, a torch system is provided that includes a cylinder base having a sidewall with a cavity and a torch support extending to a side of the sidewall, the torch support having a cavity, a cylinder configured to be received in the cavity of the sidewall, a regulator configured to be connected to the cylinder, and a torch configured to be connected to the regulator, the torch having a body and a burn tube extending from an end of the body, the burn tube configured to be received in the cavity of the torch support.

In accordance with still another embodiment of the present invention, a torch system is provided that includes a cylinder base, a cylinder configured to be supported in the cylinder base, a regulator configured to be connected to the cylinder, the regulator including a valve assembly, a knob rotatable by a user, a guide member coupled to the knob and including a pair of radially outwardly extending projections, and a ramp assembly having a ramp for each of the radially outwardly extending portions to move in to move the valve assembly to an open position, and a torch configured to be connected to the regulator, the torch having a body and a burn tube extending from an end of the body, wherein the knob is rotatable less than one hundred eighty degrees to open or close the valve assembly.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 41 is a bottom view of the cylinder base.

DETAILED DESCRIPTION OF THE INVENTION

Figure 1:
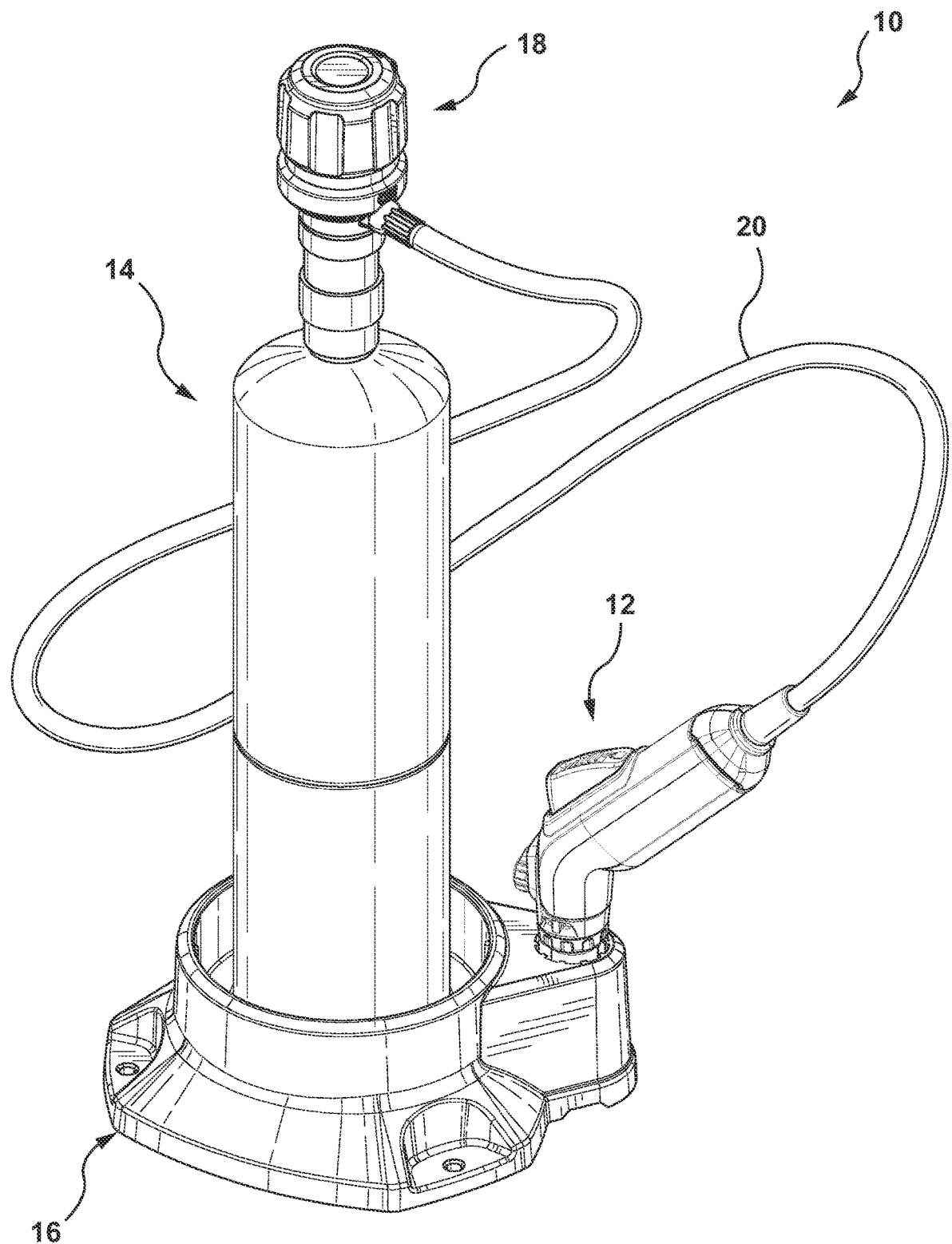
FIG. 1 is a perspective view of an exemplary torch system.
Figure 2:
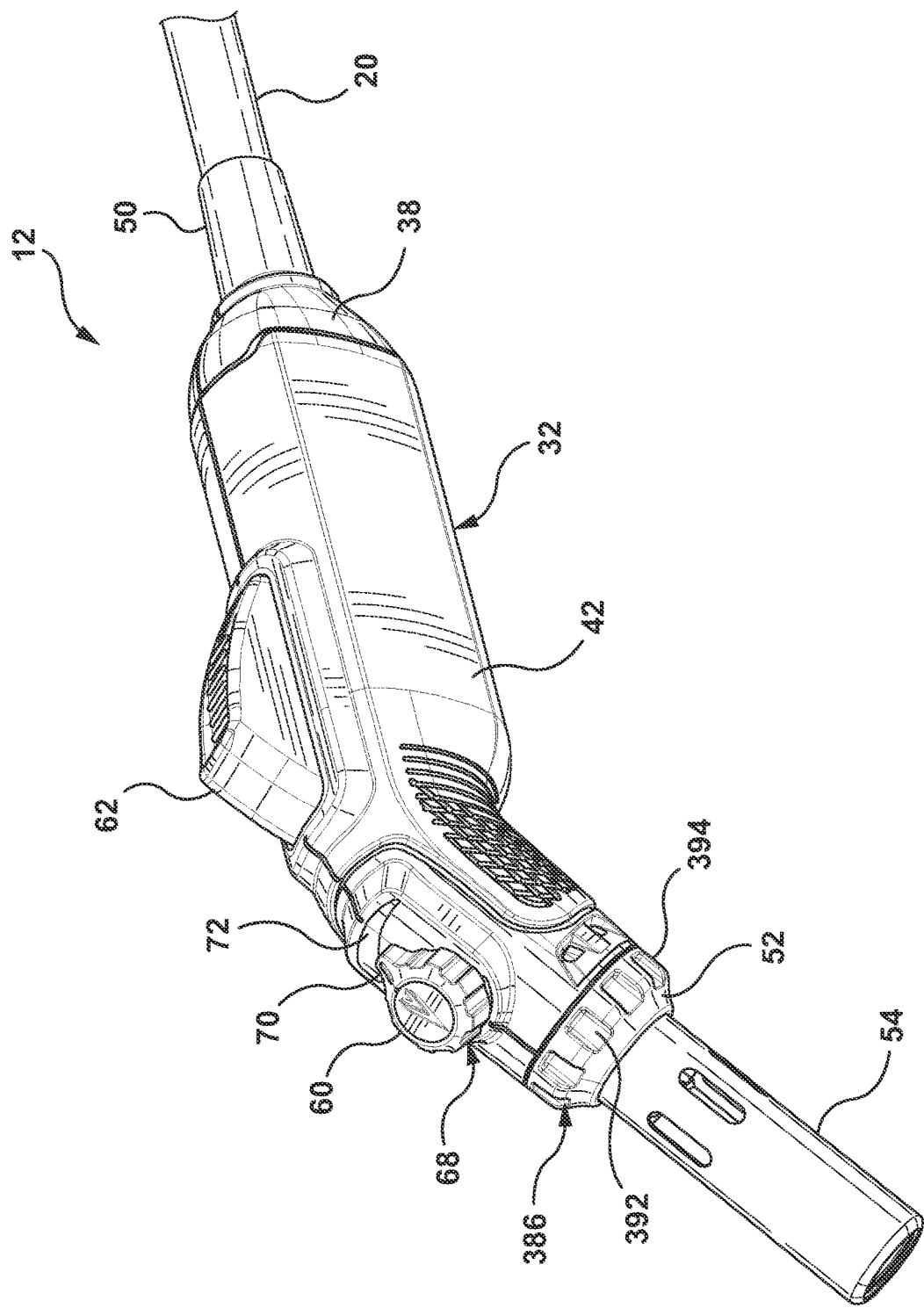
FIG. 2 is a perspective view of an exemplary torch in an off position.
Figure 3:
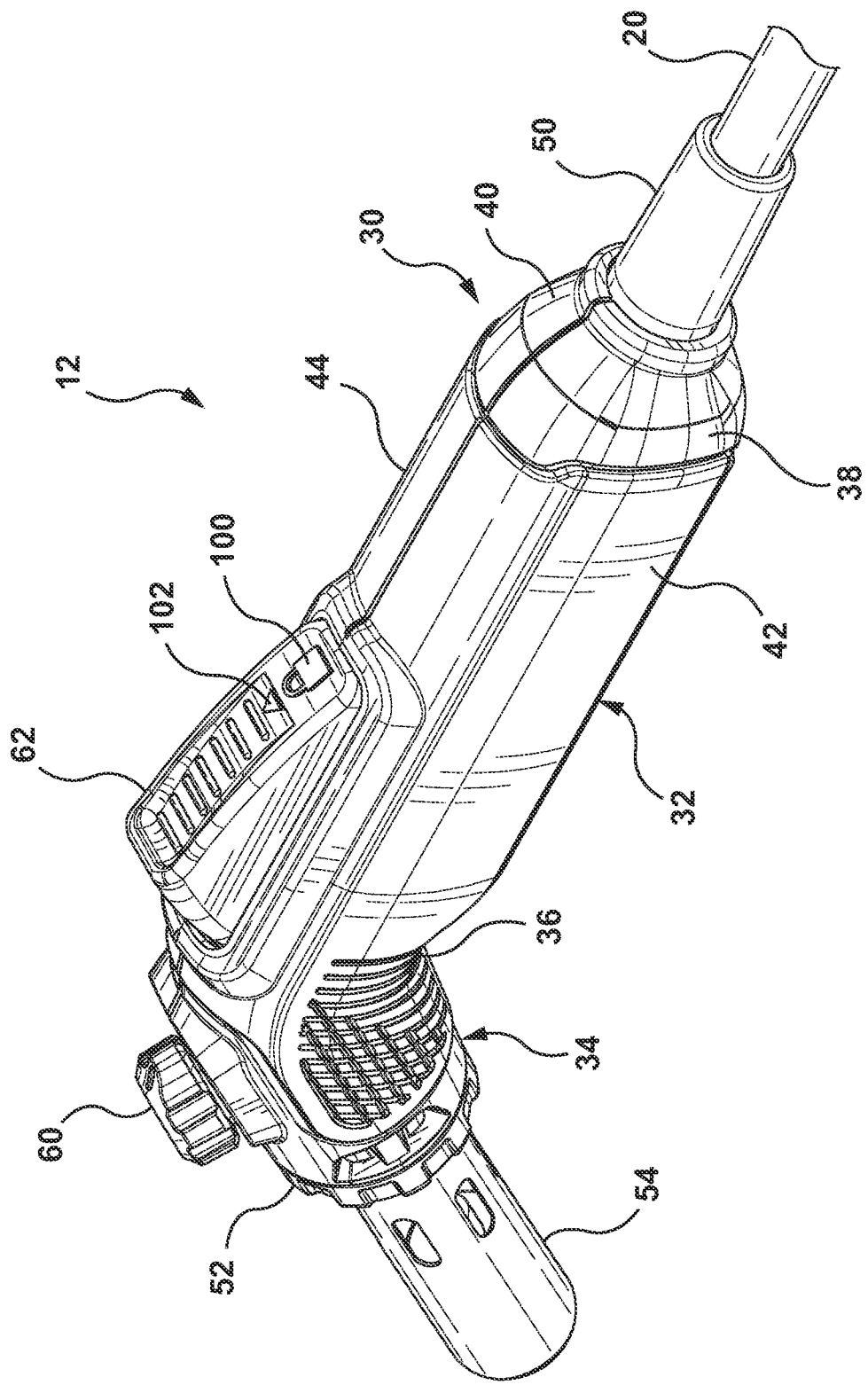
FIG. 3 is another perspective view of the torch.
Figure 4:
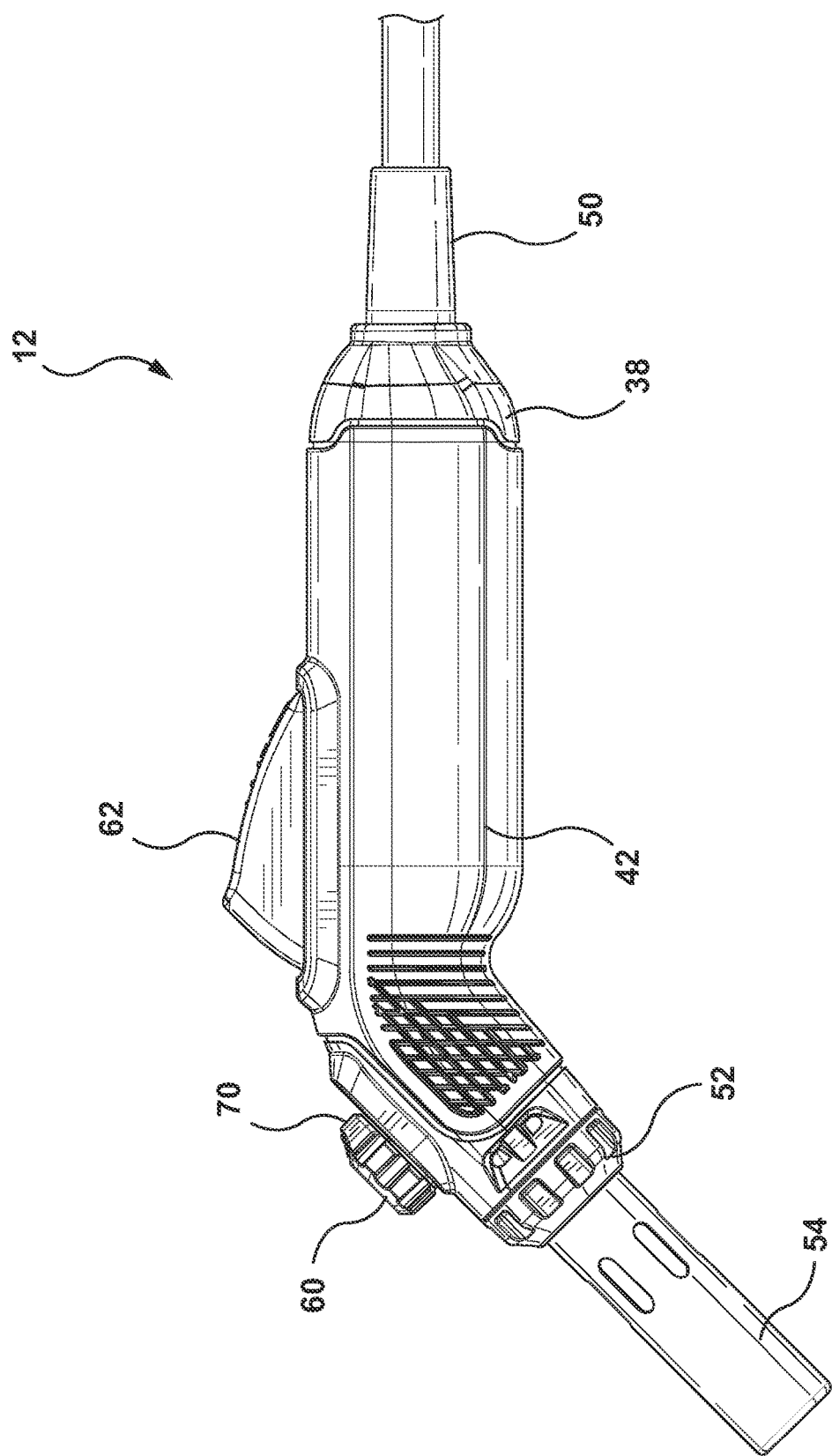
FIG. 4 is a right side view of the torch.
Figure 5:
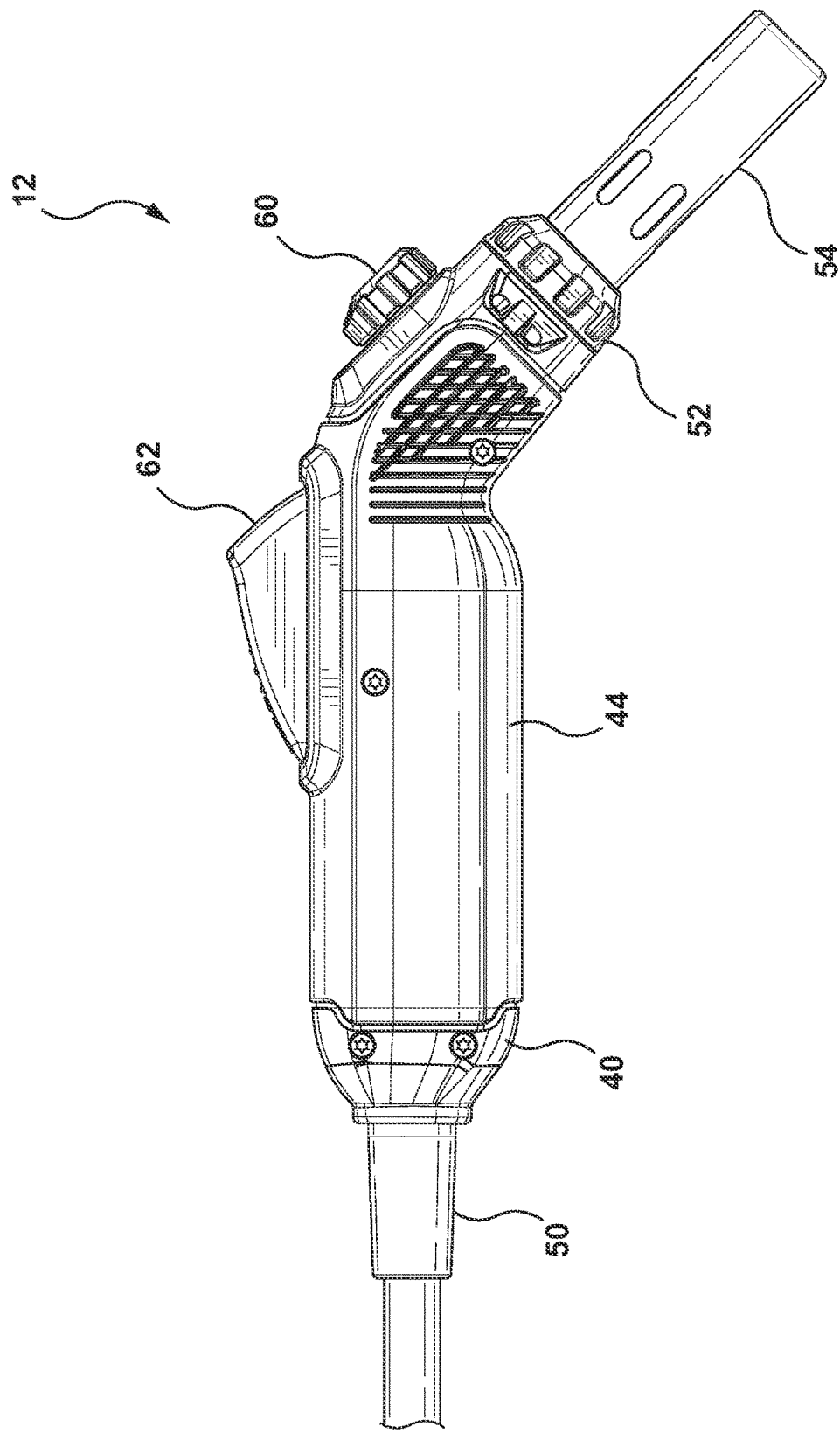
FIG. 5 is a left side view of the torch.
Figure 6:
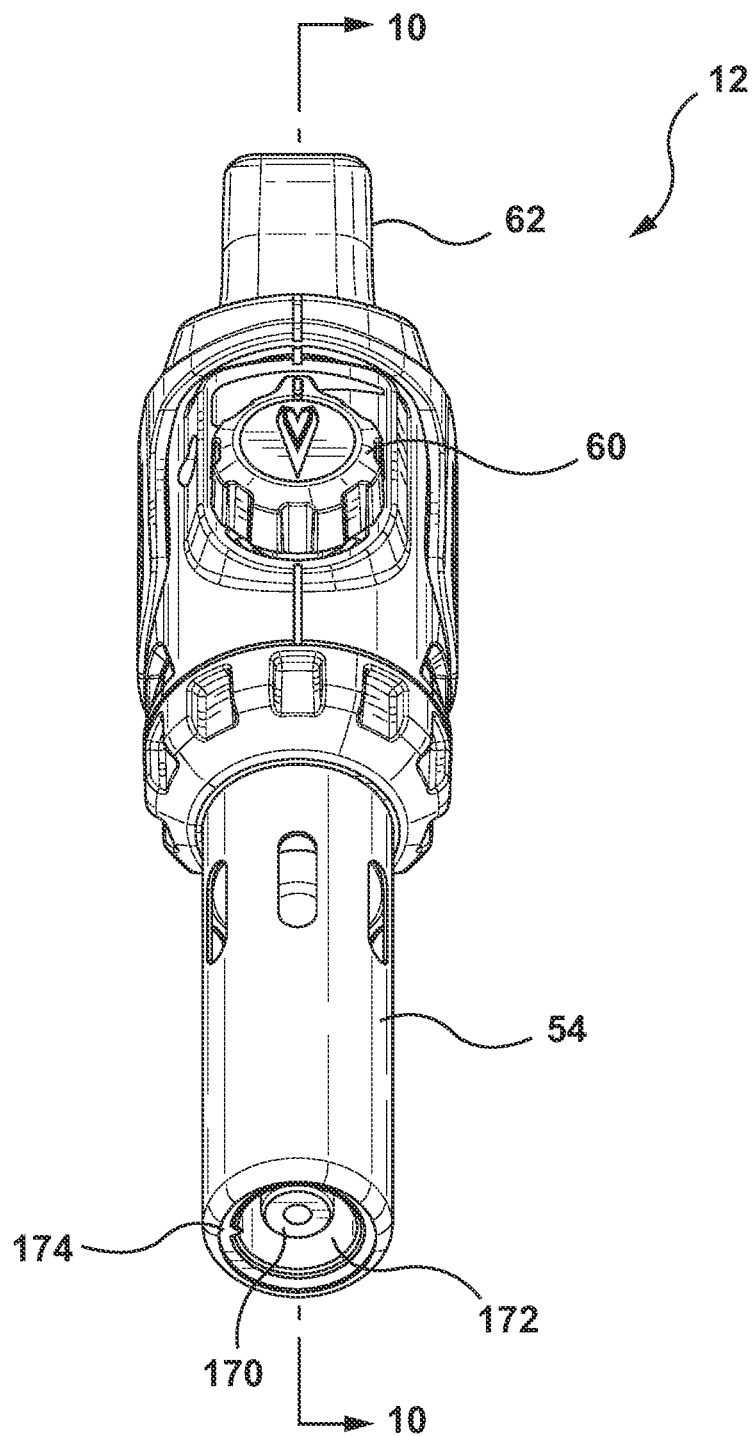
FIG. 6 is a front view of the torch.
Figure 7:
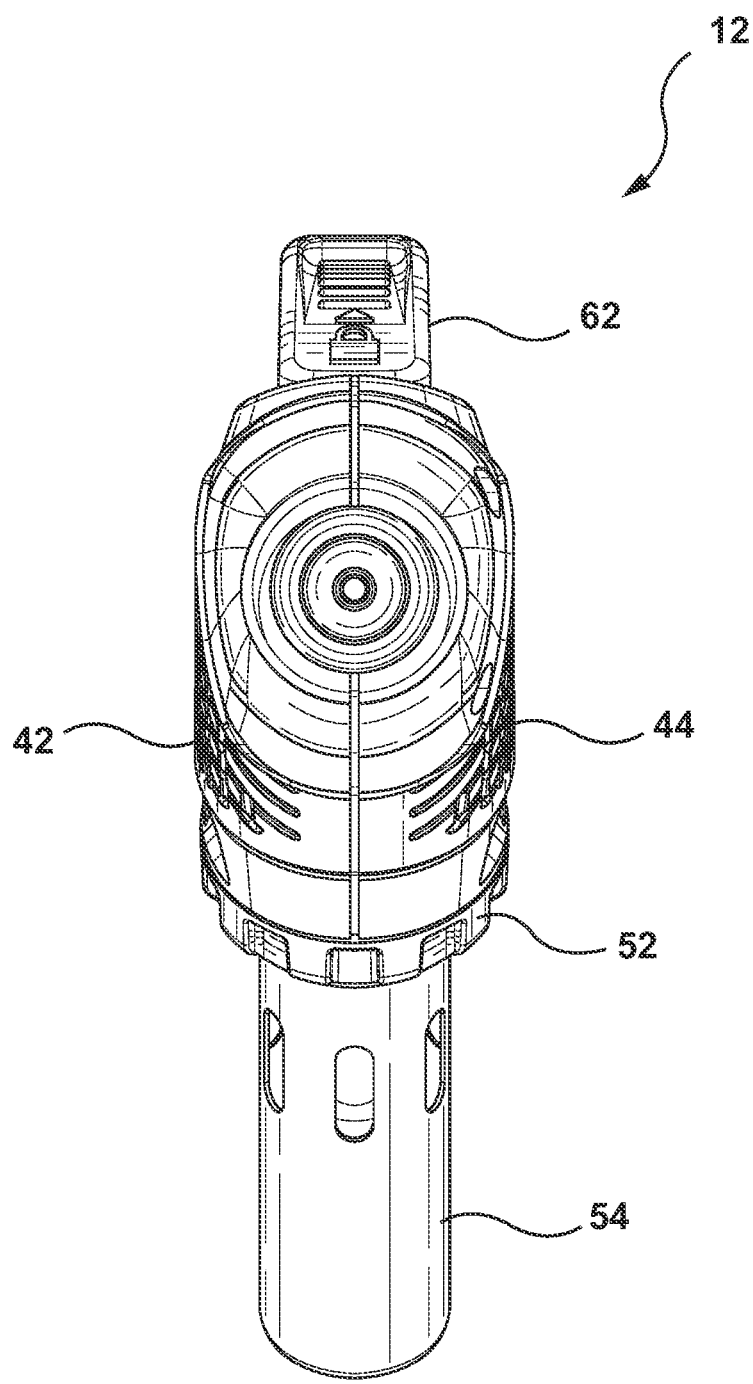
FIG. 7 is a rear view of the torch.
Figure 8:
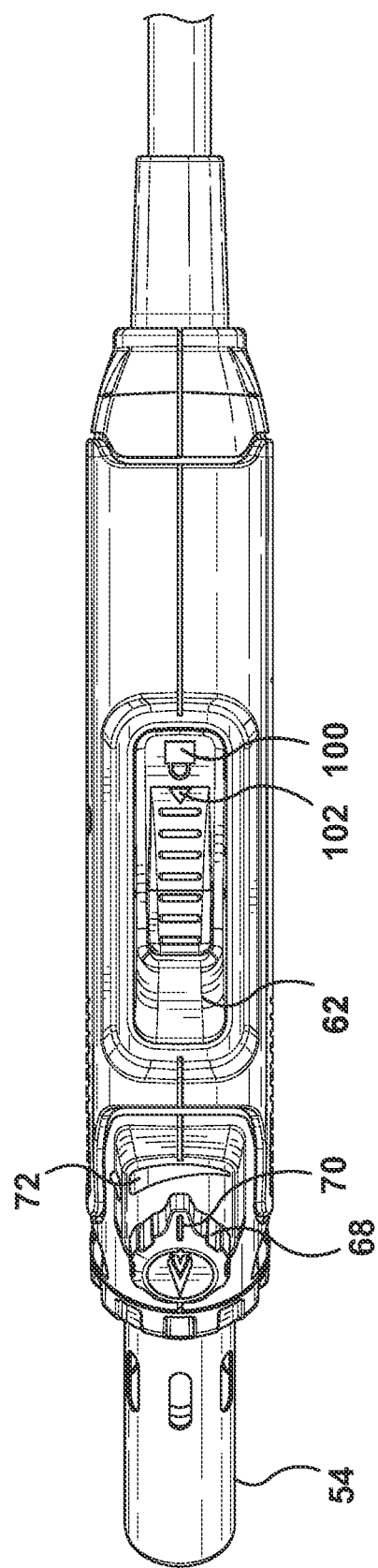
FIG. 8 is a top view of the torch.
Figure 9:
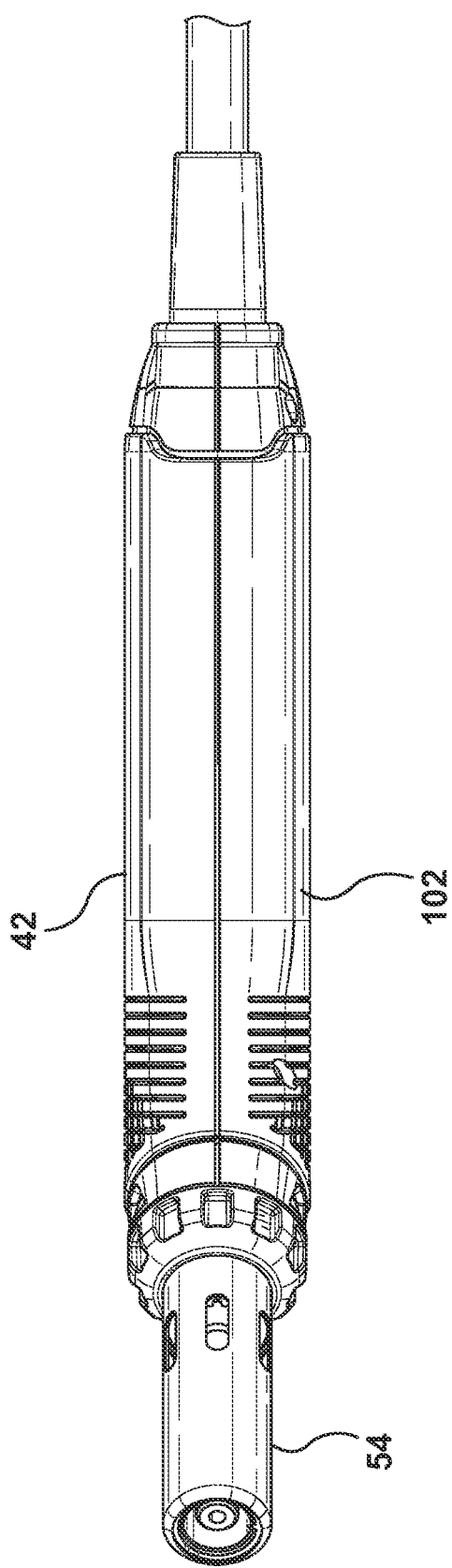
FIG. 9 is a bottom view of the torch.
Figure 10:
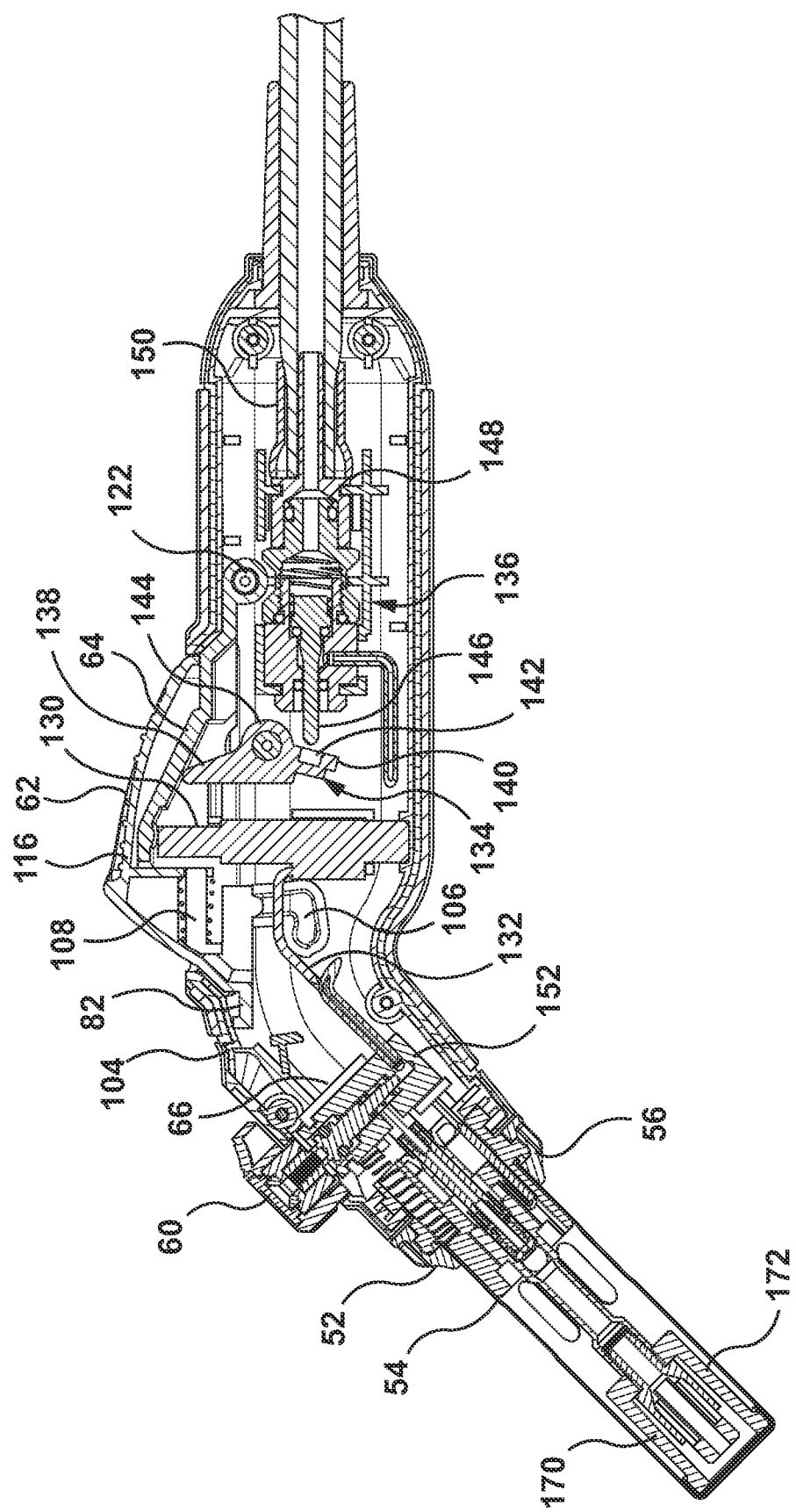
FIG. 10 is a cross-sectional view of the torch taken about line 10-10 in FIG. 6.

Embodiments of the invention relate to methods and systems that relate to a torch system including a cylinder base having a sidewall with a cavity and a torch support extending to a side of the sidewall, the torch support having a cavity, a cylinder configured to be received in the cavity of the sidewall, a regulator configured to be connected to the cylinder, the regulator including a valve assembly, a knob rotatable by a user, a guide member coupled to the knob and including a pair of radially outwardly extending projections, and a ramp assembly having a ramp for each of the radially outwardly extending portions to move in to move the valve assembly to an open position, and a torch configured to be connected to the regulator, the torch having a body and a burn tube extending from an end of the body, the burn tube configured to be received in the cavity of the torch support With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIG. 1, an exemplary torch system is illustrated at reference numeral 10. The torch system includes a torch 12, a cylinder 14, a cylinder base 16 for supporting the cylinder 14 and the torch 12, a regulator 18 connected to the cylinder 14, and a conduit 20 connected to the regulator 18 and the torch 12 for fuel to flow from the cylinder 14 to the torch 12. The cylinder 14 may store a suitable fuel, such as propane or propylene, and may be sized to be received in the cylinder base 16 as discussed below.

Turning now to FIGS. 2-10, the torch 12 will be discussed in detail. The torch 12 includes a body 30 having a first portion 32 and a second portion 34 angled downward relative to the first portion 32. In an embodiment, the second portion 34 may be angled between one and ninety degrees relative to the first portion 32. In an embodiment, the second portion 34 may be angled between thirty and sixty degrees relative to the first portion. In an embodiment the second portion 34 may be angled between thirty-five and fifty-six degrees relative to the first portion, for example forty-two degrees. In an embodiment, the second portion can be movable relative to the first portion to adjust the angle. A user can grip the first portion 32 to operate the torch 12 in a pistol holding position, and the user can grip the second portion 34 to operate the torch in a pencil holding position. For example, in the pistol holding position the user's hand can wrap around the first portion 32 for general purpose use, and in the pencil holding position the user's fingers, for example thumb and index finger, can be positioned on opposite sides of the second portion 34 with a finger resting in a groove 36 at a transition between the first and second portions 32 and 34 for precision use. The body 30 can include left and right side housings 38 and 40 coupled together in a suitable manner, such as by fasteners, and left and right side overmoldings 42 and 44 molded over portions of the left and right side housings 38 and 40 for user comfort. The torch 12 also includes a sleeve 50 extending from the first portion 32 that surrounds the conduit 20, and head 52 coupled to an end of the second portion 34, and a burn tube 54 extending from the head 52 and held in position between the head 52 and a collar 56.

The torch 12 additionally includes a control knob 60 at the second portion 34, a trigger 62 at the first portion 32, and a pivot arm 64 coupled to the trigger 62 and the body 30 at the first portion 32. The control knob 60 and trigger 62 are in proximity to one another such that a user can operate the control knob 60 and the trigger 62 with one hand and without turning the torch off to allow for one-handed operation of the torch 12. The control knob 60 is coupled to a first valve assembly 66 disposed in and coupled the body 30 between the left and right side housings 38 and 40. The control knob 60 is movable between a plurality of positions to adjust the first valve assembly 66 to adjust the size of the flame of the torch 12 without extinguishing the flame. The control knob 60 includes a plurality of grip portions 68 for a user to grip to adjust the knob 60, and a projection 70 or suitable indicia pointing toward indicia 72 on the body 30 to indicate to the user the size of the flame. For example, the indicia 72, which may be part of the overmoldings 42 and 44, can be represented by a shape that increases in size from left to right to represent the smallest size flame at the left and the largest size flame at the right. In an embodiment, the control knob 60 can adjust the flame length from fifteen millimeters to forty millimeters by effecting a ninety degree turn of the first valve assembly 66 from left to right.

Figure 12:
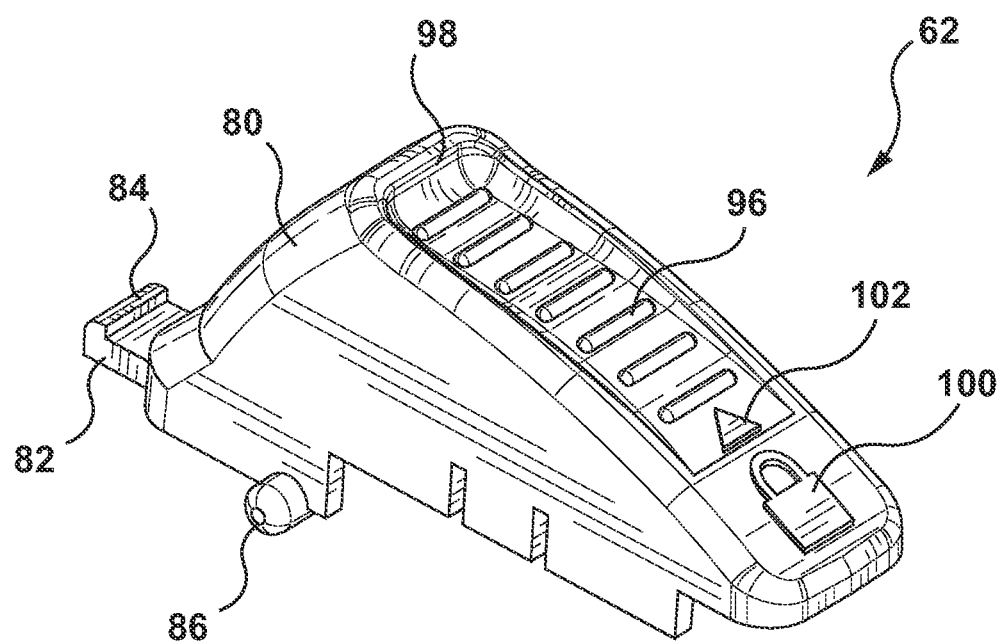
FIG. 12 is a perspective view of a trigger.
Figure 13:
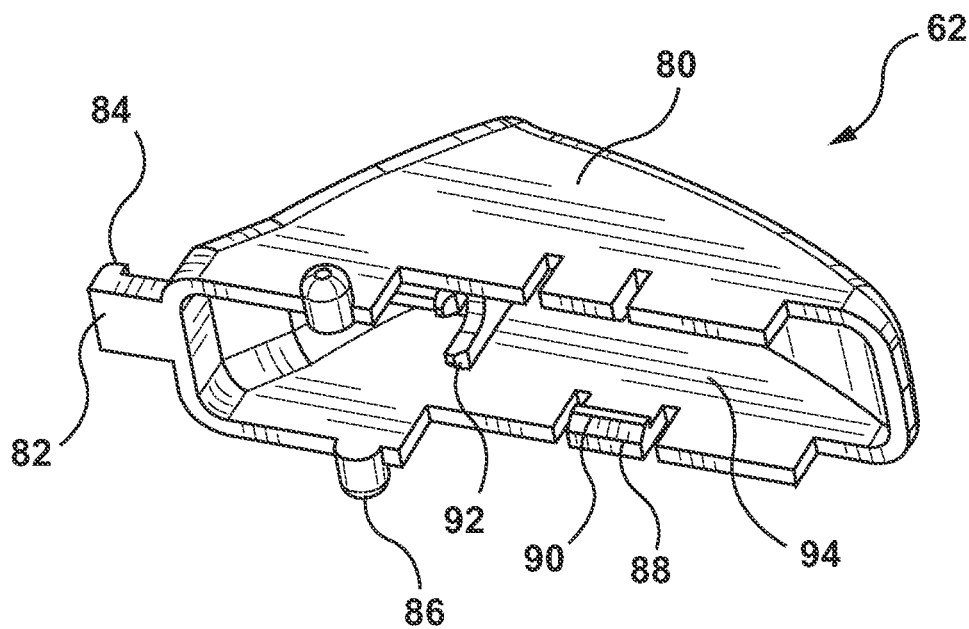
FIG. 13 is another perspective view of the trigger.

Referring additionally to FIGS. 12 and 13, the trigger 62 includes a body 80, a deflectable tab 82 projecting from the front of the body 80 that has a catch 84, a pair of projections 86 projecting from sides of the body 80, a pair of deflectable tabs 88 in sides of the body 80 that have radially inwardly extending catches 90, and a spring seat 92 within a cavity 94 of the body 80. The top of the body 80 can include grip areas 96 and a ledge 98 for a user to press against when moving the trigger 62 downward and forward to the locked position, and indicia 100 and 102, for example a lock 100 and arrow 102, that indicate to the user the direction to move the trigger 12 to lock the trigger 12 in the locked position.

The catch 84 extends upward from the deflectable tab 82 for engaging a ledge 104 in the body 30 to lock the trigger 62 in the locked position. The projections 86 project from the sides of the body 80 and each is configured to move within a channel 106 in the respective left and right side housing 38 and 40. When the trigger 62 is moved to the locked position, the projections 86 move downward and forward toward the second portion 34 within the channels 106 and abut an end of the respective channel 106 when the catch 84 is engaged with the ledge 104. When the trigger 62 is moved to the off position, the projections 86 are move downward out of the end of the channels to disengage the catch 84 and then rearward toward the sleeve 50 and upward toward a top of the body 30 by a force of a spring 108 abutting spring seat 92. The catches 90 of the deflectable tabs 88 are disposed in respective slots 110 (FIG. 14) in the pivot arm 64 to couple the trigger 62 to the pivot arm 64. The catches 90 move within the slots 100 as the trigger 62 is moved between the on and off position.

Figure 14:
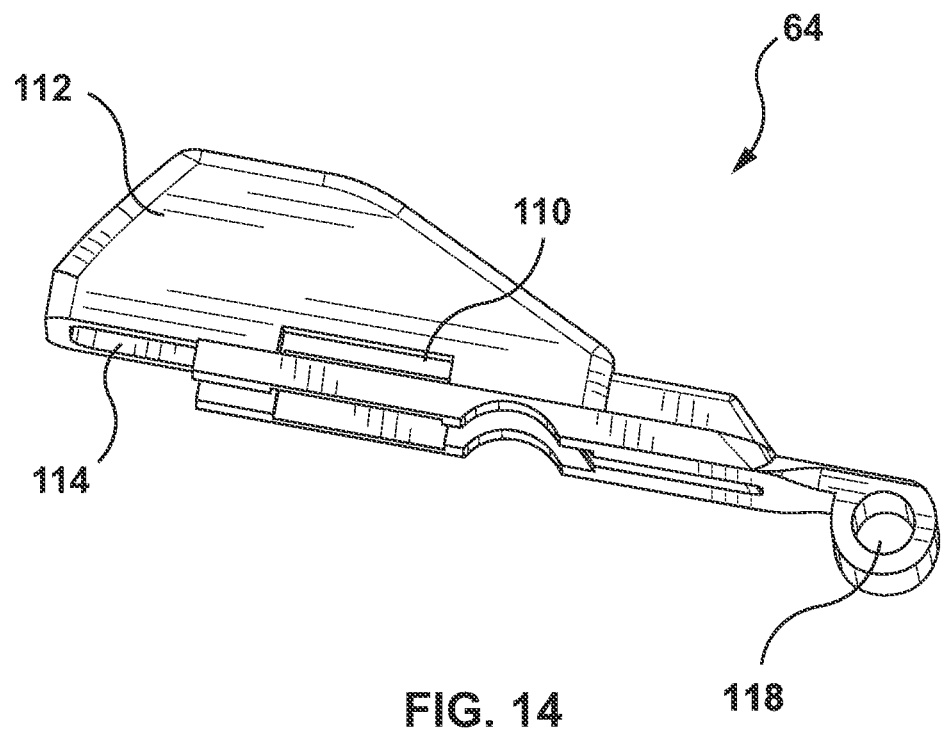
FIG. 14 is a perspective view of a pivot arm.
Figure 15:
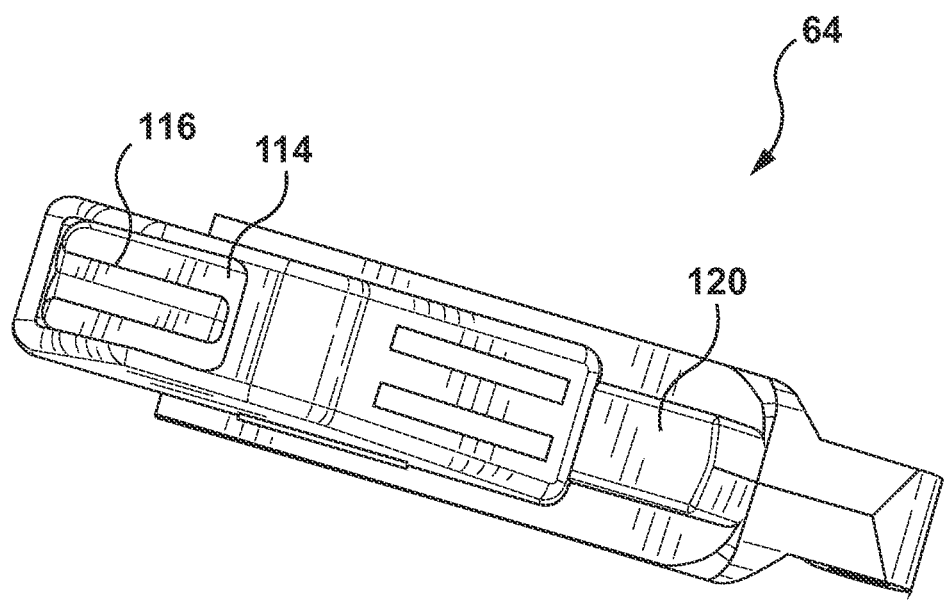
FIG. 15 is a top view of the pivot arm.
Figure 18:
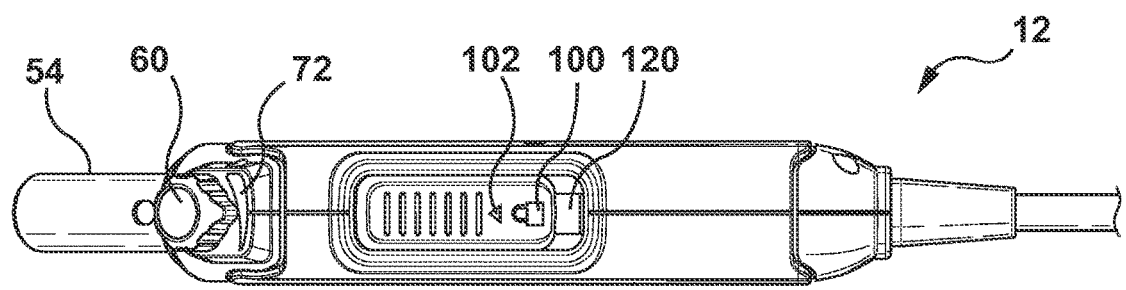
FIG. 18 is a top view of the torch in the locked position.
Figure 19:
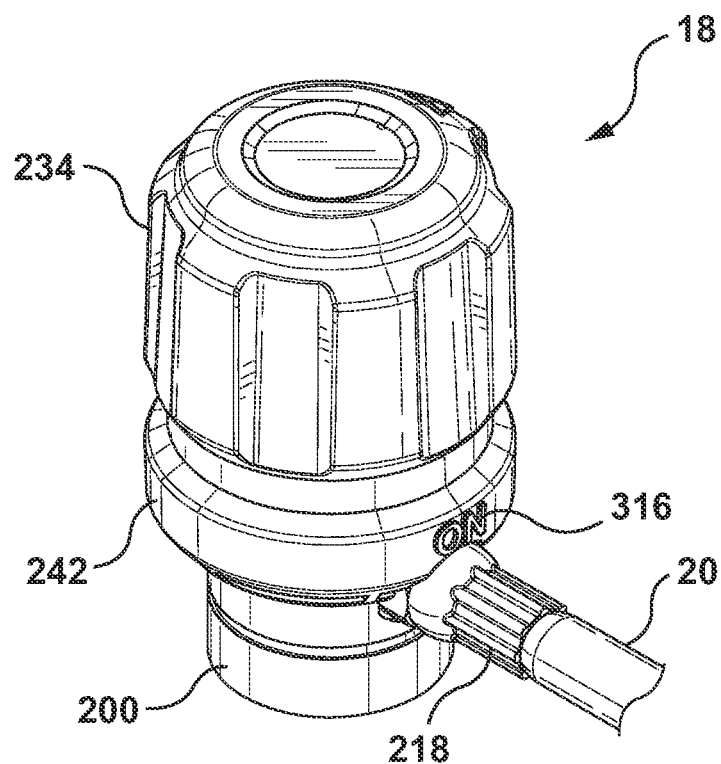
FIG. 19 is a perspective view of an exemplary regulator.
Figure 20:
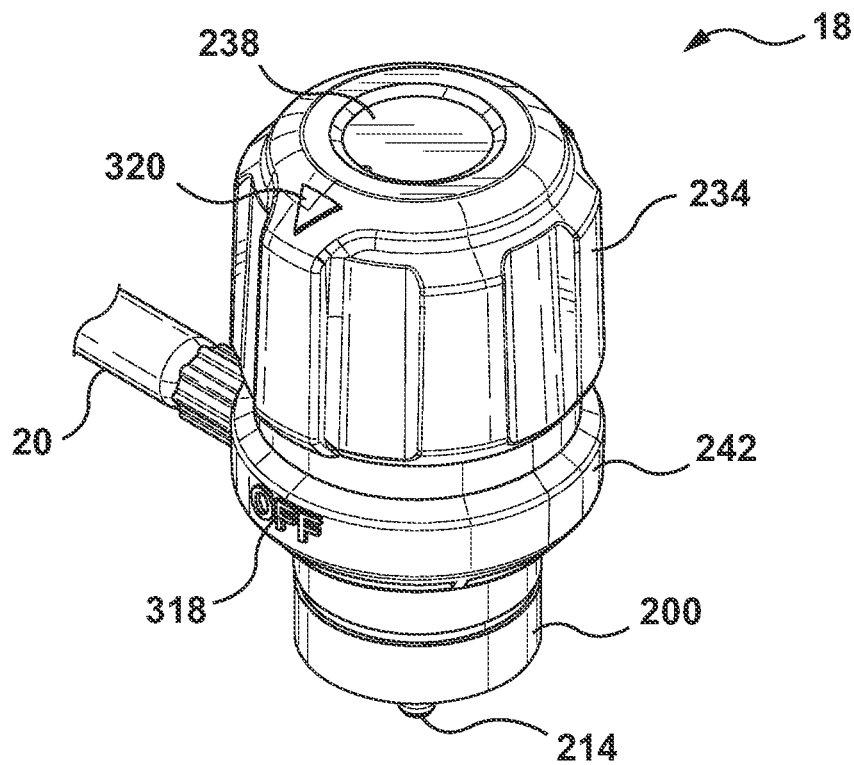
FIG. 20 is another perspective view of the regulator.
Figure 21:
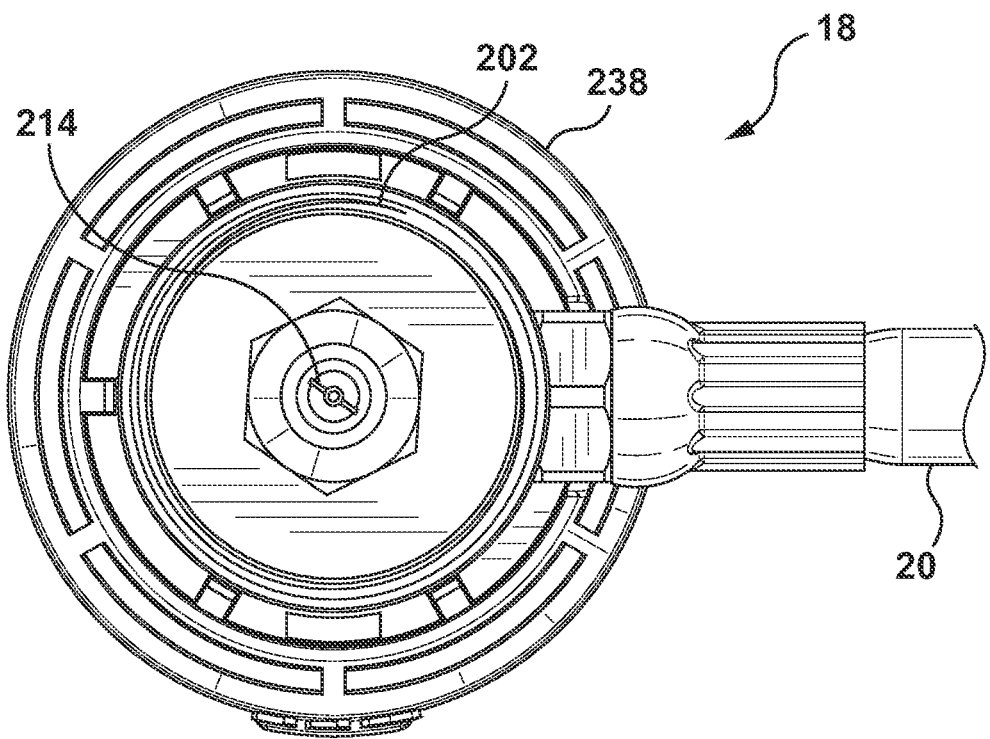
FIG. 21 is a bottom view of the regulator.
Figure 22:
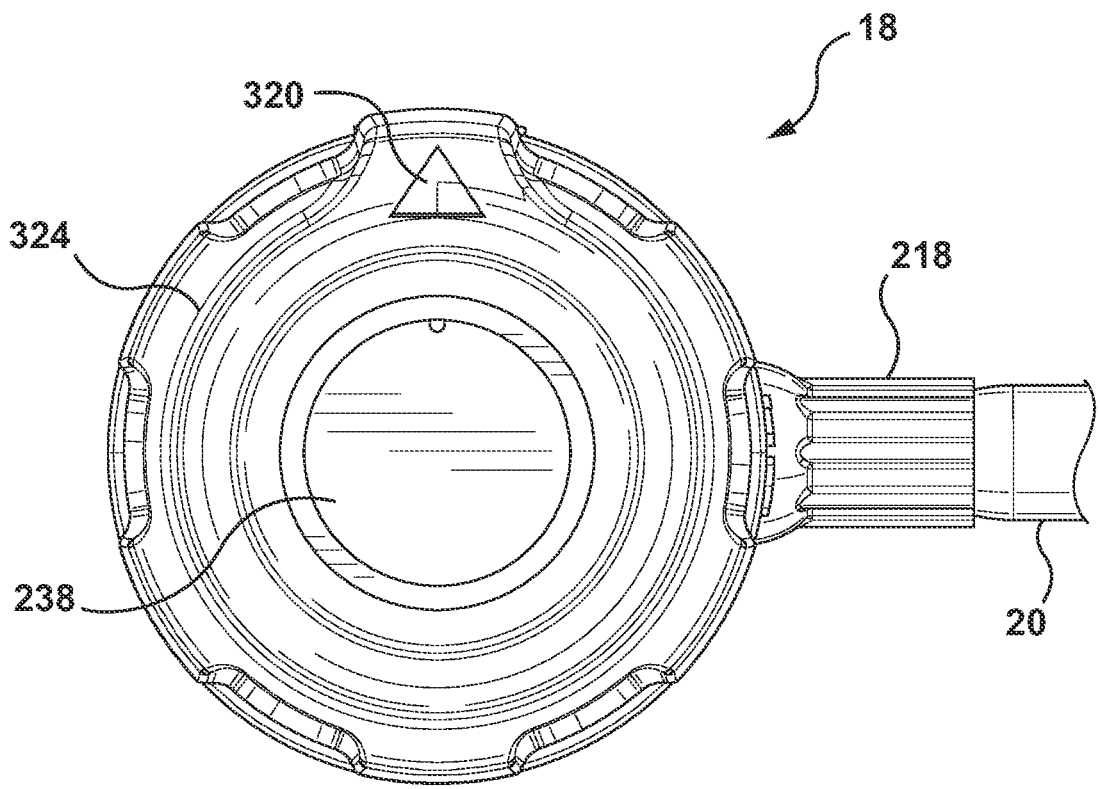
FIG. 22 is a top view of the regulator.
Figure 23:
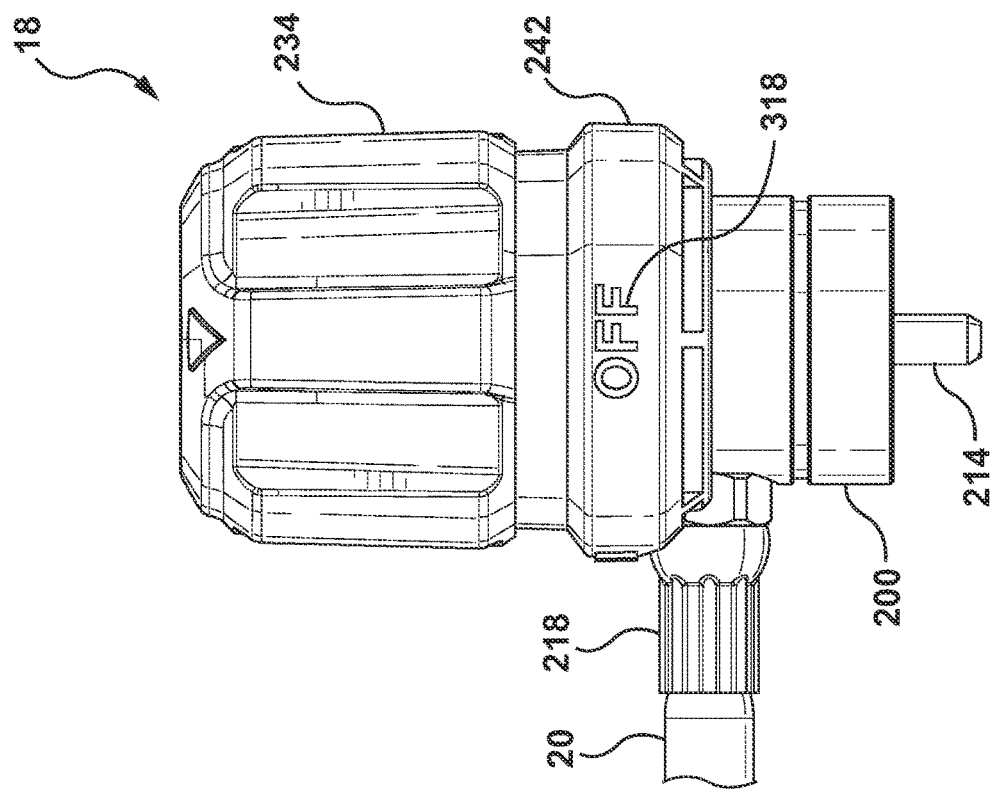
FIG. 23 is a left side view of the regulator.
Figure 24:
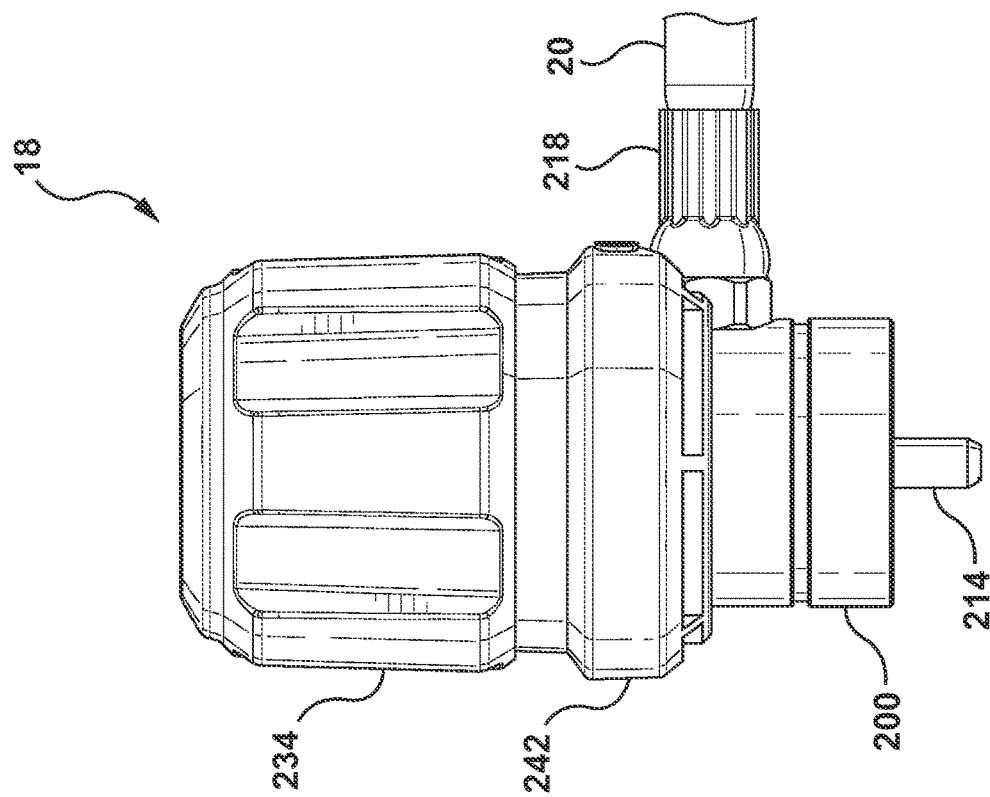
FIG. 24 is a right side view of the regulator.
Figure 26:
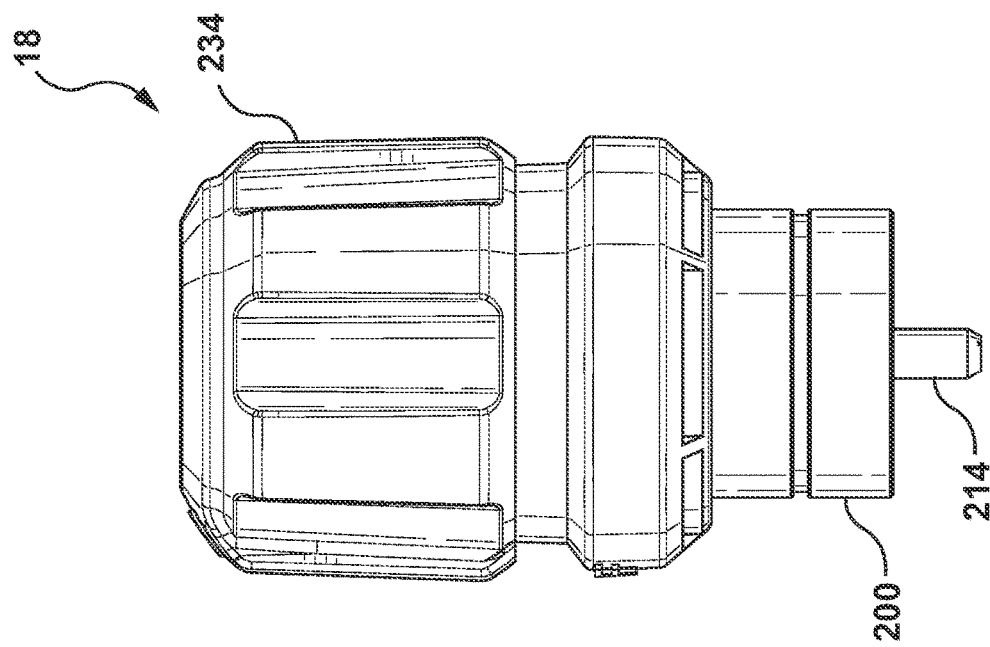
FIG. 26 is a rear view of the regulator.
Figure 25:
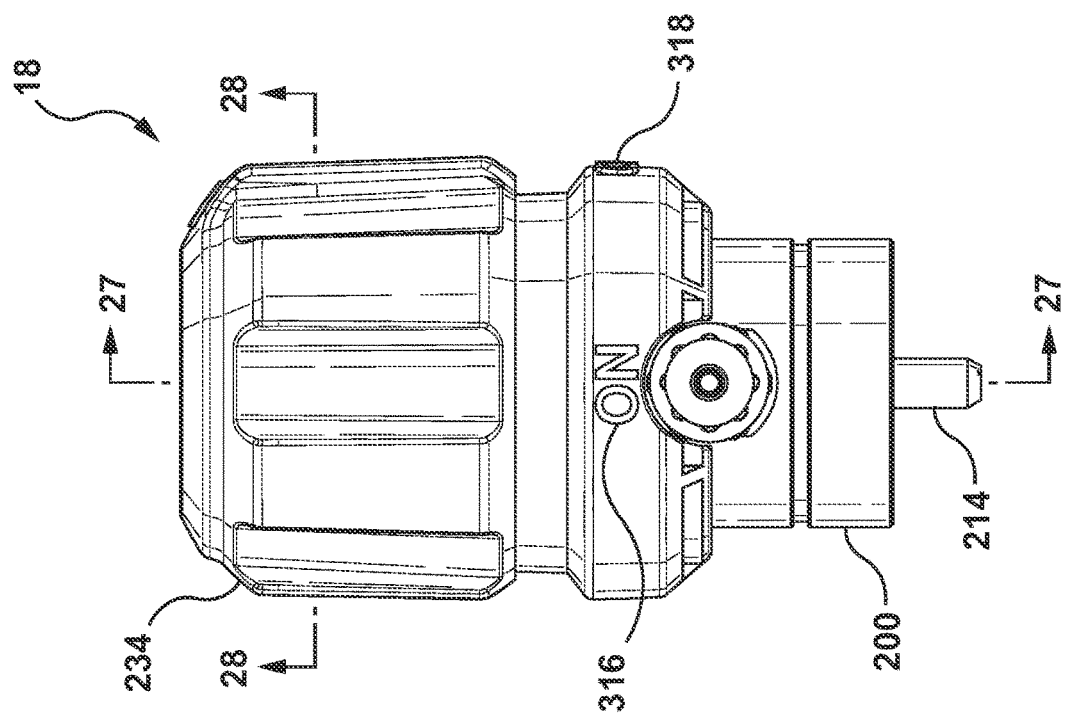
FIG. 25 is a front view of the regulator.
Figure 27:
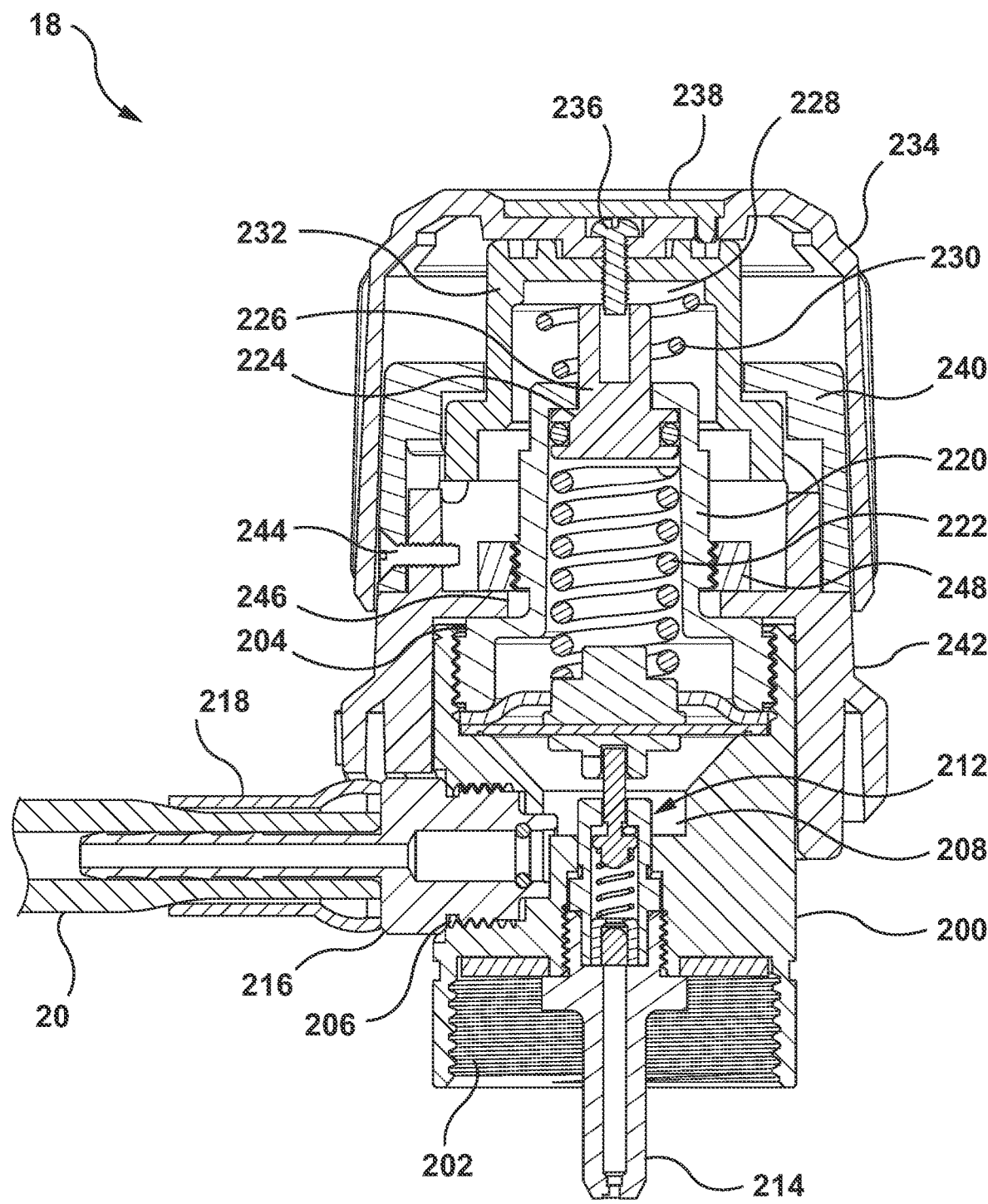
FIG. 27 is a cross-sectional view taken about line 27-27 in FIG. 25.

Referring additionally to FIGS. 14 and 15, the pivot arm 64 includes a body 112 having a cavity 114, a projection 116 in the cavity 114 surrounded by the spring 108, an opening 118 at an end of the pivot arm 64, and the slots 110 in sides of the body 112. The body 112 includes an indicator portion 120 that is covered when the trigger 62 is in the off position and that is uncovered when the trigger 62 is in the locked position as shown in FIG. 18. The indicator portion 120 may be a suitable color, such as red, to indicate to the user that the torch is locked in the locked position. Additionally or alternatively, the indicator portion 120 may include indicia to indicate the torch is locked in the locked position. It will be appreciated that the entire pivot arm 64 may be colored the suitable color, or only a portion of the pivot arm 64 may be colored the suitable color. The opening 118 extends substantially perpendicular to the direction of movement of the trigger 62 to receive a pivot 122 about which the pivot arm 64 pivots. The pivot 122 may be a projection projecting inward from one or both of the left and right side housings 38 and 40.

As the pivot arm 64 is moved downward by movement of the trigger 62, the pivot arm 64 actuates an igniter 130, such as a piezoelectric igniter having a top disposed within the cavity 114 to create a spark in the burn tube 54 via conductor 132. The downward movement of the pivot arm 64 also moves a seesaw 134 to open a second valve assembly 136 disposed in the first portion 32. The seesaw 134 includes a first leg 138, an opening 140, and a second leg 142. The opening 140 extends substantially perpendicular to the direction of movement of the trigger 62 to receive a pivot 144 about which the seesaw 134 pivots. The pivot 144 may be a projection projecting inward from one or both of the left and right side housings 38 and 40. As the pivot arm 64 moves downward, the body 112 of the pivot arm 64 contacts the first leg 138 of the seesaw 134 causing the seesaw 134 to pivot about the pivot 142 and move the second leg 140 toward the sleeve 50. The second leg 140 contacts a stem 146 of the second valve assembly 136 to move the stem 146 toward the sleeve 50 to open the second valve assembly 136. The second valve assembly 136 includes a hose barb 148 that receives the conduit 20, which can be held in position by a sleeve 150, such as a crimp sleeve. When the second valve assembly 136 is open, fuel flows from the conduit 20, through the second valve assembly 136 to a conduit 152 connecting the first and second valve assemblies 66 and 136.

Figure 11:
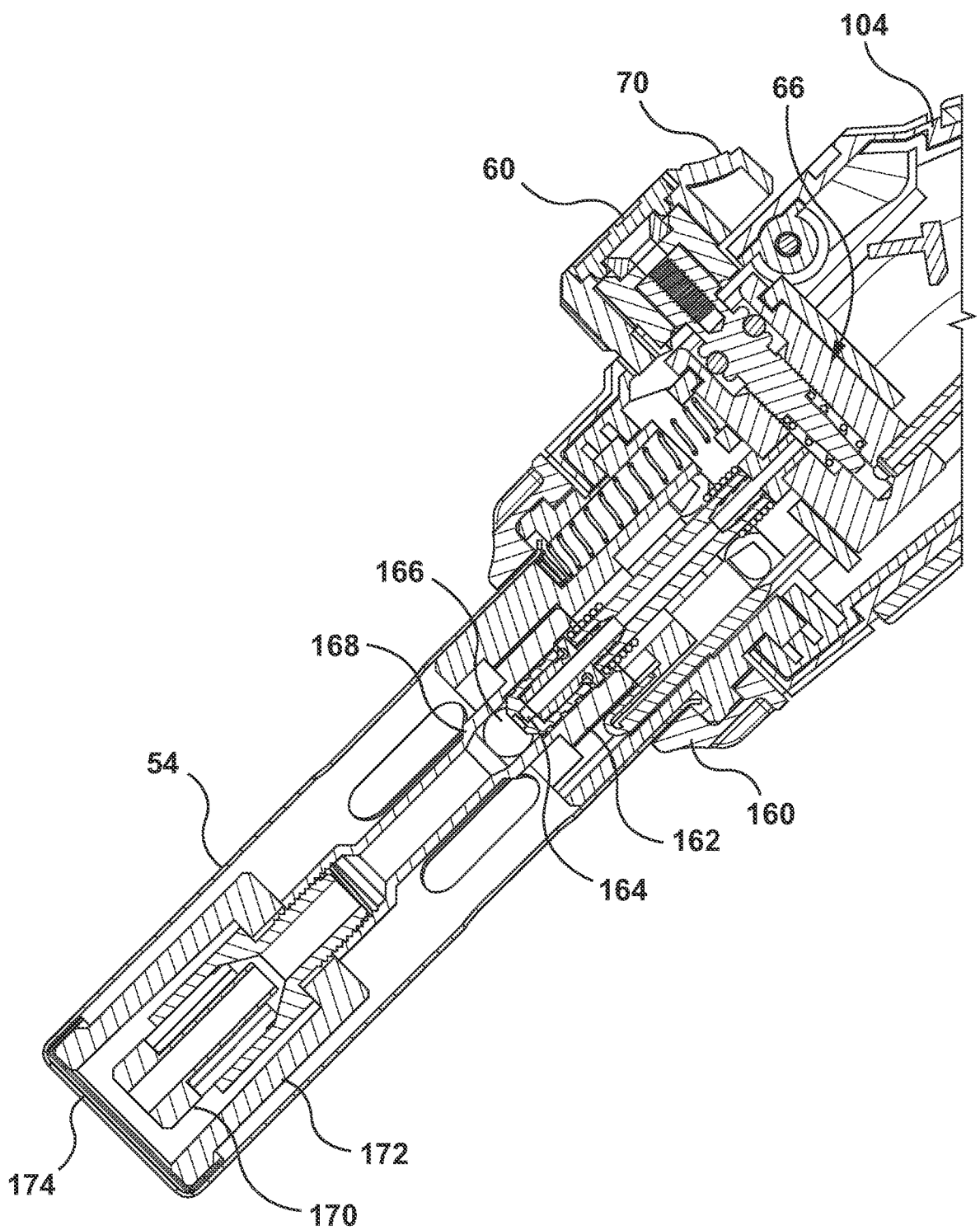
FIG. 11 is an enlarged view of a portion of the cross-section of FIG. 10.

Referring again to FIGS. 10 and 11, disposed within the burn tube 54 is a conduit 160 connected to the first valve assembly 66 to deliver fuel to a nozzle 162 within the burn tube 54. The nozzle 162 includes an orifice 164 through which the fuel flows to optimize the flame size to mix with air from a pair of venturi ports 166 in a flame guide 168 to provide for flame consistency and stability. In an embodiment, the orifice may be between nine hundredths of a millimeter in diameter and thirteen hundredths of a millimeter in diameter, for example twelve hundredths of a millimeter in diameters. A tip 170 can be attached to the flame guide 168 and be surrounded by a flame holder 172 at an end of the burn tube, for example a ceramic flame holder that serves as a thermal break in the stainless steel burn tube 54. Surrounding the ceramic flame holder 172 at its downstream end adjacent the end of the burn tube 54 is a ring 174 to which the igniter spark arcs. The arrangement creates a pencil style or pinpoint style flame providing flame accuracy with a fuel such as propane or propylene that provides for increased heat at a worksite.

Figure 16:
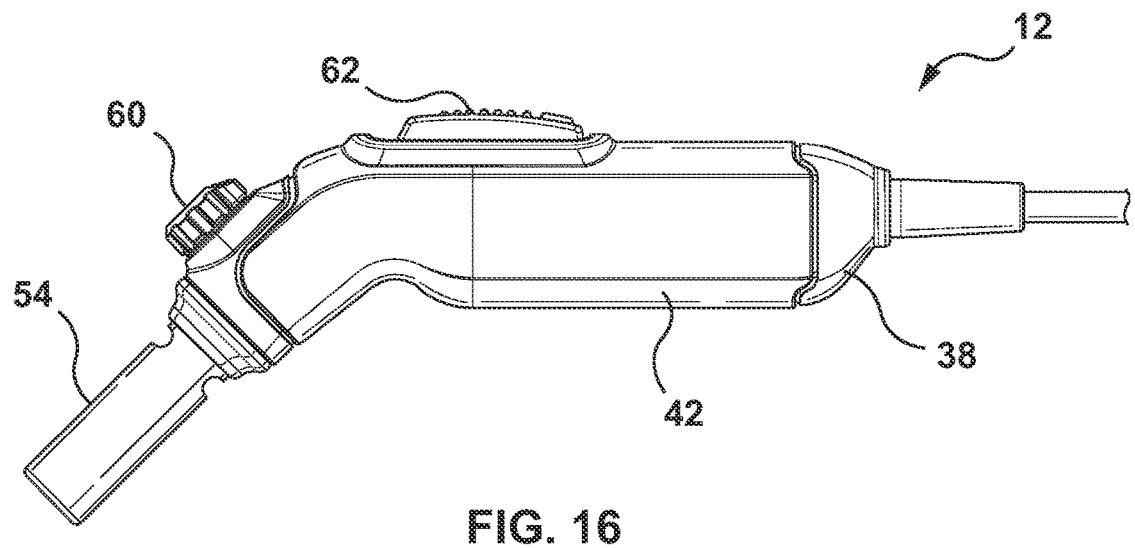
FIG. 16 is a right side view of the torch in an ignition position.
Figure 17:
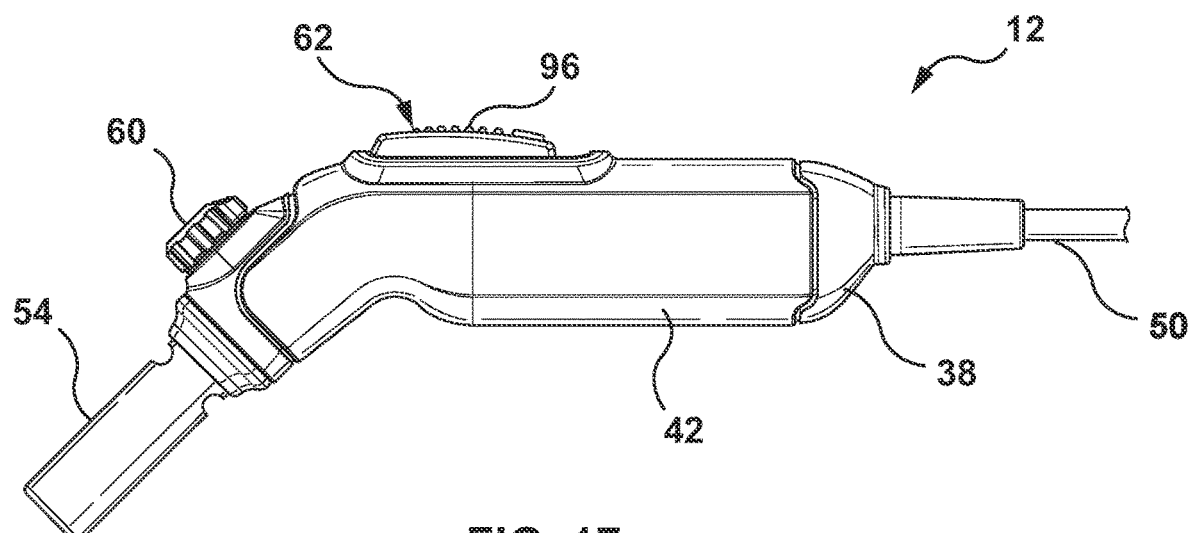
FIG. 17 is a right side view of the torch in a locked position.

Referring now to FIGS. 10 and 16-18, to operate the torch 12, the user presses down on the trigger 62 moving the trigger to the ignition position or on position shown in FIG. 16. The pressing of the trigger 62 moves the trigger 62 and pivot arm 64 downward about pivot 122 to actuate the igniter 130. The downward movement of the pivot arm 64 moves the body 112 of the pivot arm 64 into contact with the first leg 138 of the seesaw 134, causing the seesaw 134 to pivot about the pivot 142 and move the second leg 140 to contact the stem 146 to open the second valve assembly 136 to allow fuel to flow from the conduit 20, through the second valve assembly 136 to the conduit 152. If desired, the user could release the trigger 62 to move the trigger to its original or off position shown in FIG. 2. Alternatively, the trigger 62 can be moved forward causing the catches 90 to move within the slots 100 of the pivot arm to move the trigger 62 relative to the pivot arm 64, the projections 86 to move forward toward the second portion 34 within the channels 106 and abut an end of the respective channel 106, and the spring seat 92 to move the spring 108 to a compressed position. In this position, the catch 84 of the deflectable tab 82 is engaged with the ledge 104 to lock the trigger 62 in the locked position, which can be indicated by the indicator portion 120 being visible. When the torch is lit, the user is able to control the flame size with one hand by adjusting the control knob 60, for example by moving the projection 70 side to side with the user's thumb.

Turning now to FIGS. 19-33, the regulator 18 will be discussed in detail. The regulator 18 includes a body 200 having a first port 202, a second port 204, and a third port 206, and a fluid passage 208 extending between the first and second ports 200 and 202. The third port, which is perpendicular to the first and second ports 202 and 204, opens into the fluid passage 208. The first port 202 of the body can be connected to the cylinder 14, for example by a threaded connection. A valve assembly 212 is disposed in the first port 202 and fluid passage 208. The valve assembly 212 includes a needle 214 that is connected to the body 200 in the fluid passage 208, for example by a threaded connection, and that extends through the first port 202 and into the cylinder 14. The third port 206 of the body can be connected to a hose barb 216, for example by a threaded connection. The conduit 20 is received on the hose barb 216, and can be held in position by a sleeve 218, such as a crimp sleeve.

The second port 204 of the body 200 can be connected to a spring sleeve 220, for example by a threaded connection. The spring sleeve 220 surrounds a spring 222 that biases a piston 224 in a first position. The piston 224 has a portion that is disposed in and abuts an end of the spring sleeve 220, and a portion that extends through an opening 226 in the spring sleeve 220 to abut a spring seat 228. The spring seat 228 and a top of the spring sleeve 220 serve as seats for a spring 230. The spring seat 228 also abuts a guide member 232 that is disposed between the spring seat 228 and a knob 234 and is secured to the knob 234 and the spring seat 228 by a fastener 236. A cover 238 can be placed over the fastener 236 and attached to the knob 234 in any suitable manner. Surrounding the guide member 232 is a first ramp member 240 that abuts and is coupled to a second ramp member 242 in a suitable manner, such as by a fastener 244. The second ramp member 242 receives an end of the body 200 having the second port 204, and includes a radially inwardly extending ledge 246 abutted on one side by the spring sleeve 220 and on another side by a nut 248 that is connected to the threads on an outer surface of the spring sleeve 220.

Figure 28:
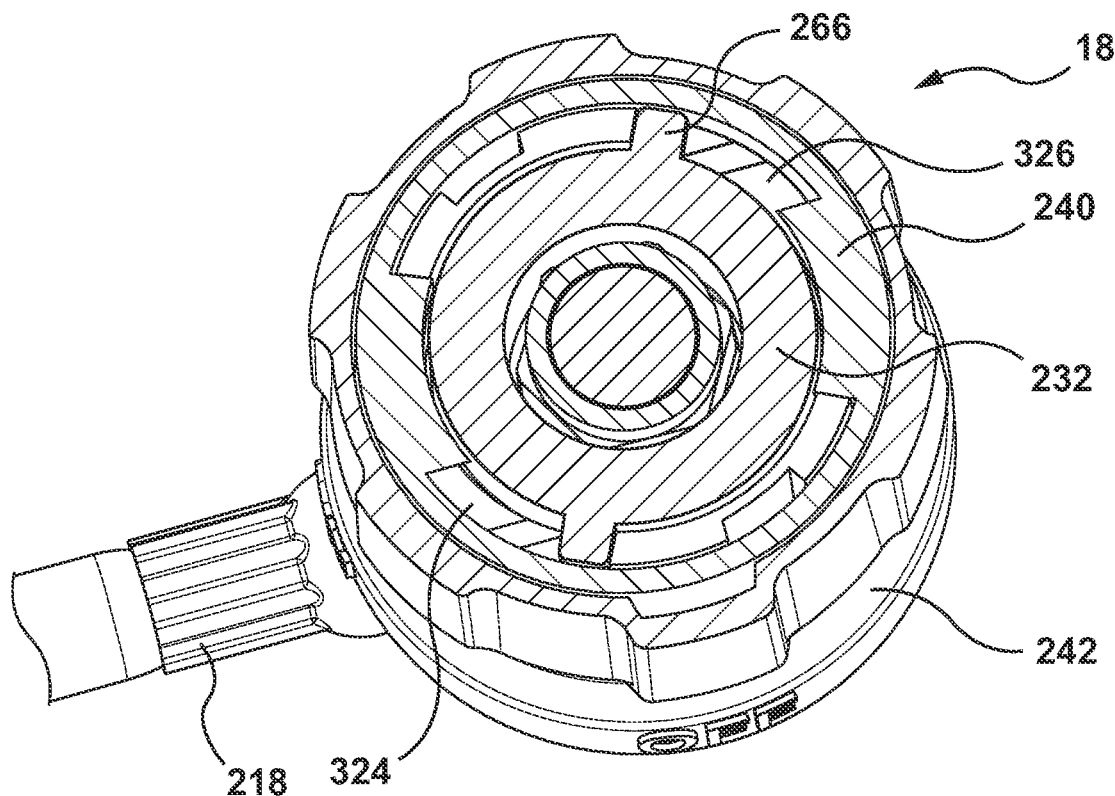
FIG. 28 is a cross-sectional view taken about line 28-28 in FIG. 25.
Figure 29:
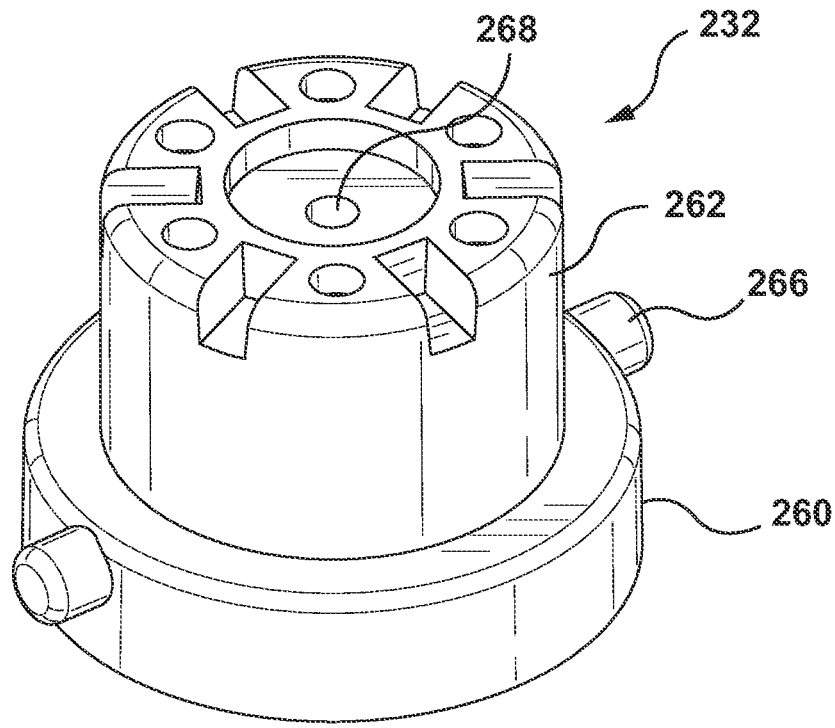
FIG. 29 is a perspective view of a guide member.

Referring additionally to FIGS. 28-29, the guide member 232 includes a first portion 260 disposed in a space between the first and second ramp members 240 and 242, and a second portion 262 extending through an opening 264 in the first ramp member 240. The first portion 260 includes a pair of radially outwardly extending projections 266, such as diametrically opposed projections, and the second portion 262 includes an opening 268 through which the fastener 236 extends.

Figure 30:
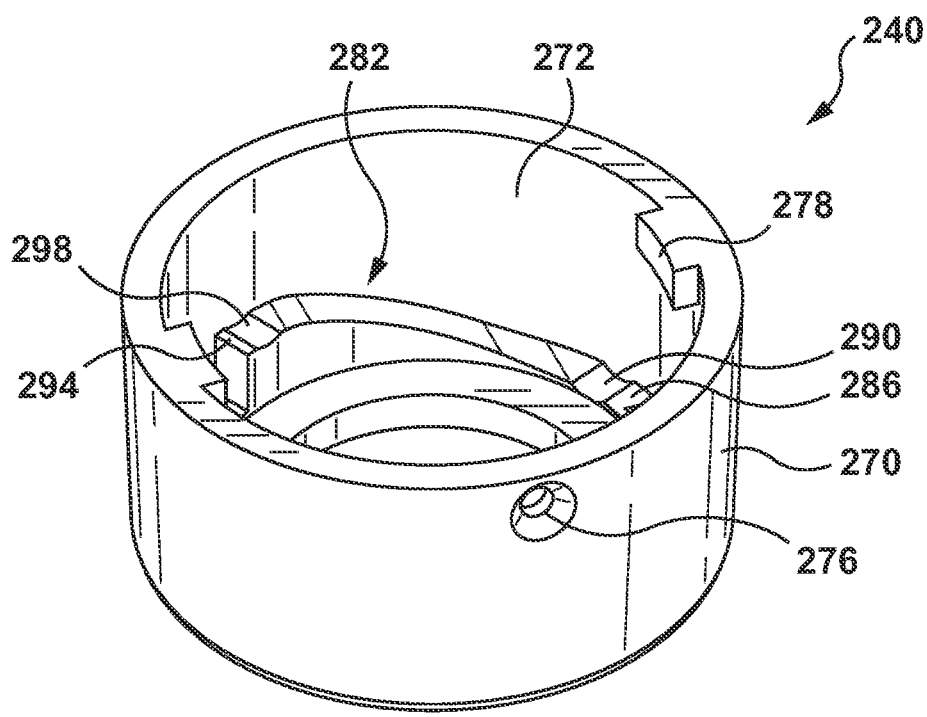
FIG. 30 is a perspective view of a first ramp member.
Figure 31:
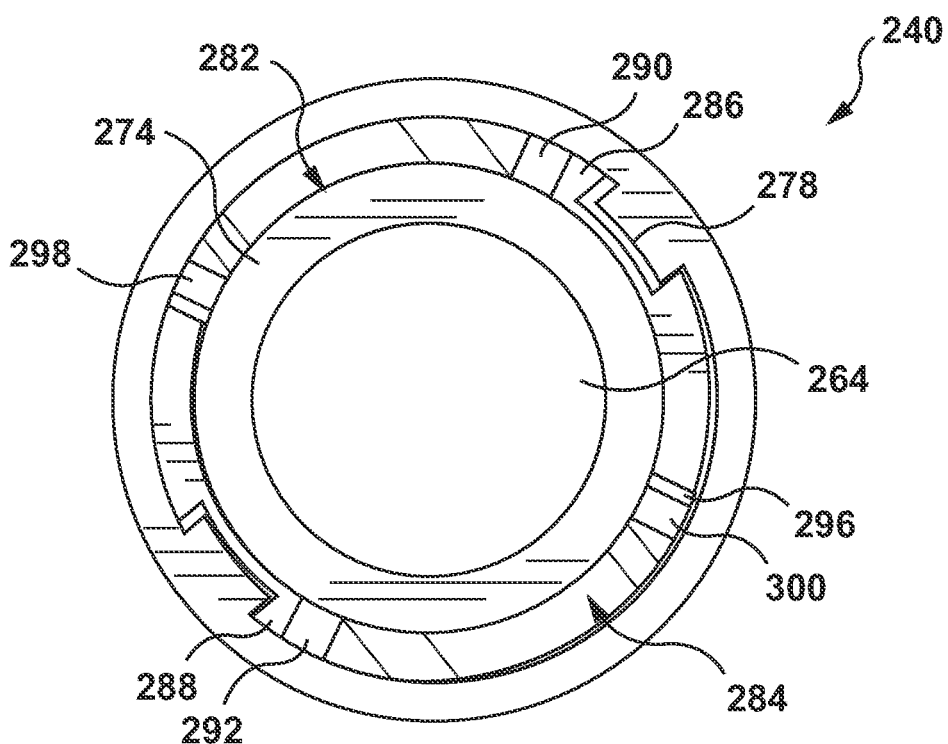
FIG. 31 is a bottom view of the first ramp member.

Referring additionally to FIGS. 30-31, the first ramp member 240 includes a body 270 defining a cavity 272 opening to a bottom of the body, a wall 274 at a top of the body, the wall having the opening 264 that opens into the cavity 274, an opening 276 in the body 270 through which the fastener 244 extends, and a pair of radially inwardly extending projections 278. The projections 278, such as diametrically opposed projections, extend radially inwardly from the body in the cavity and are configured to be received in respective slots 280 in the second ramp member 242.

The first ramp member 240 also includes a pair of upper ramps 282 and 284 in the cavity 272 extending from the wall 274. The upper ramps 282 and 284 may be diametrically opposed ramps each having an upper portion 286, 288 with a groove 290, 292 above one of the projections 266 in a closed position, and a lower portion 294, 296 with a groove 298, 300 above one of the projections 266 in an open position. The upper ramps 282 and 284 curve along an inner surface of the body 270 and downward from the upper portions 286 and 288 to the lower portions 294 and 296.

Figure 32:
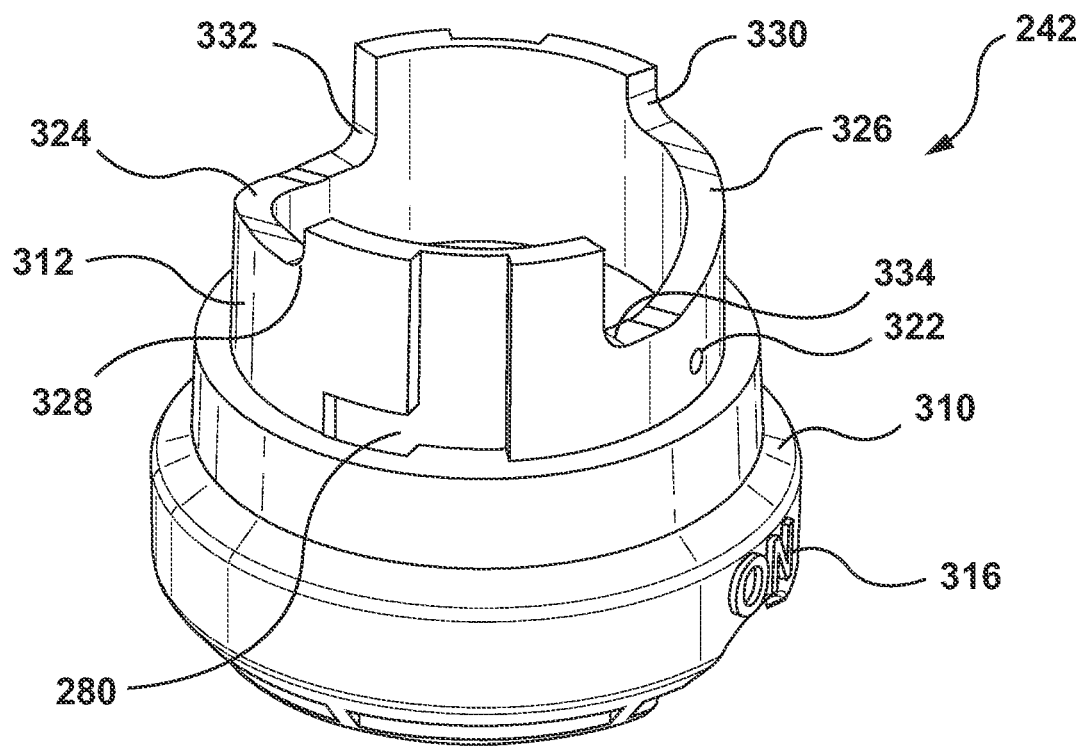
FIG. 32 is a perspective view of a second ramp member.
Figure 33:
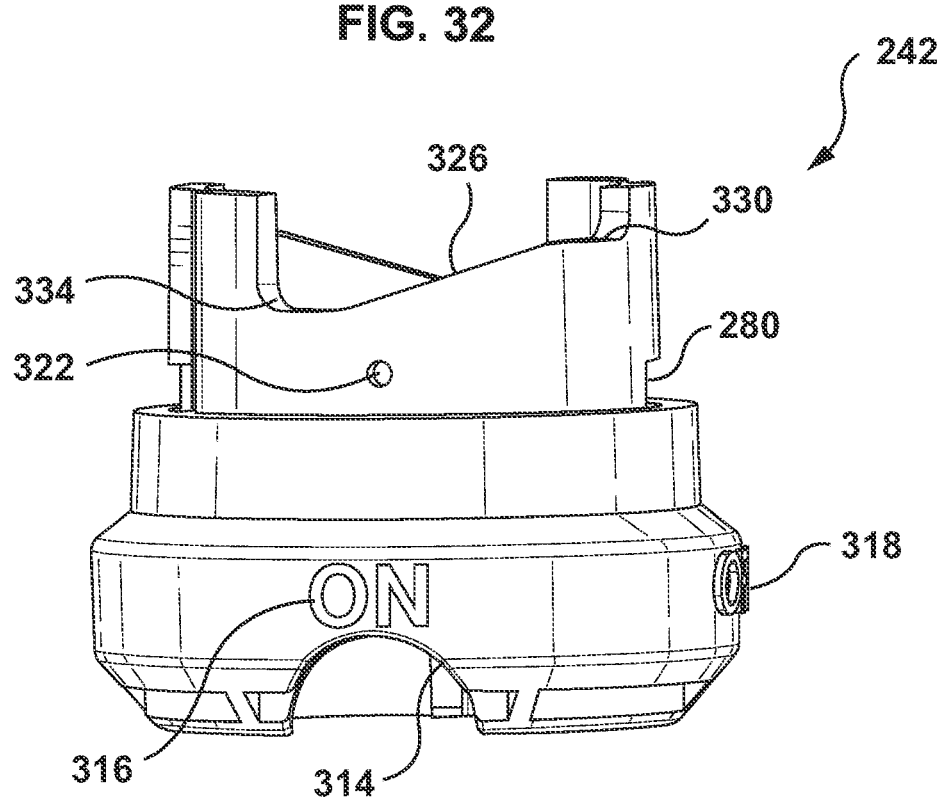
FIG. 33 is another perspective view of the second ramp member.
Figure 34:
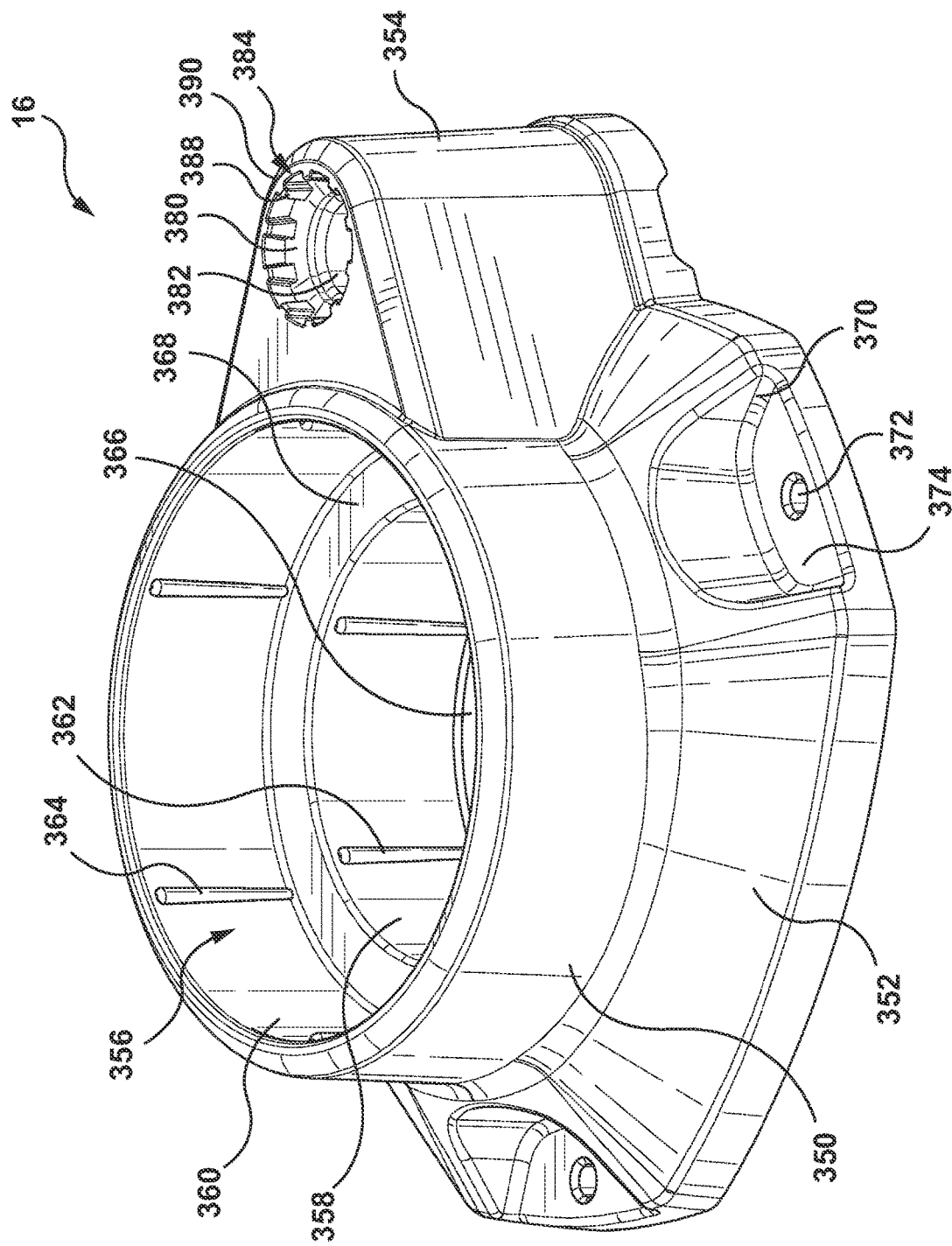
FIG. 34 is a perspective view of a cylinder base.
Figure 35:
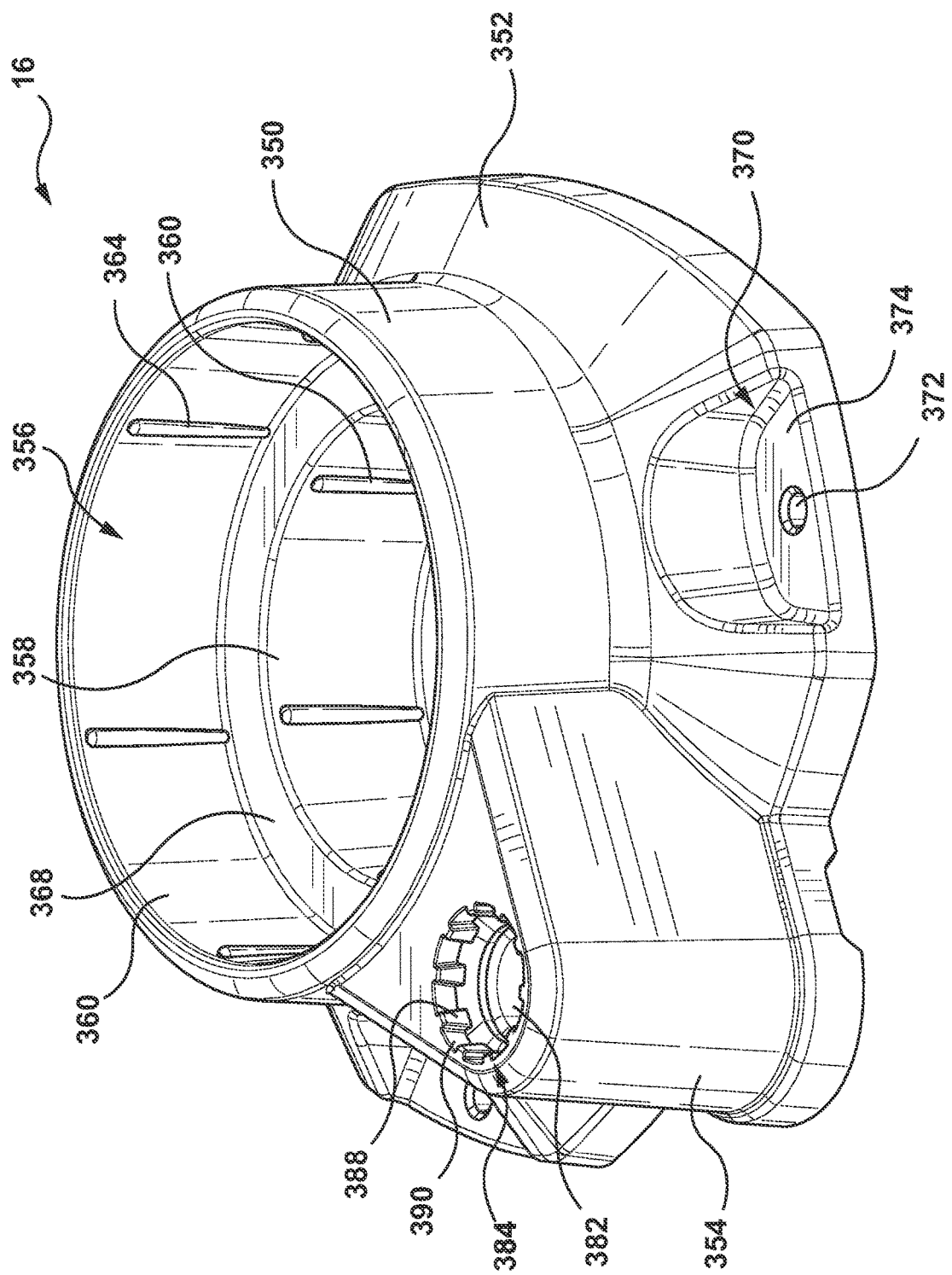
FIG. 35 is another perspective view of the cylinder base.
Figure 36:
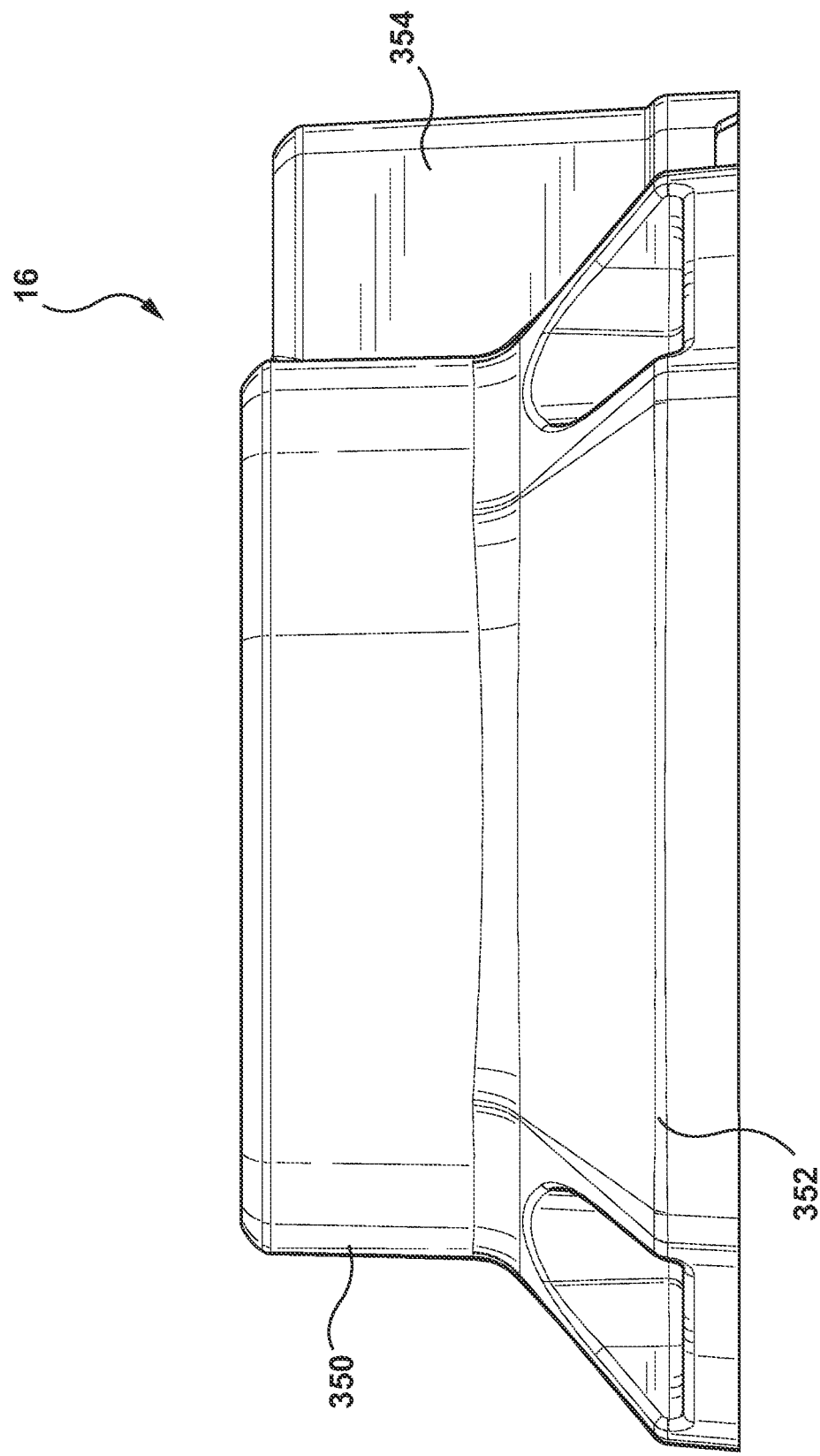
FIG. 36 is a front view of the cylinder base.
Figure 37:
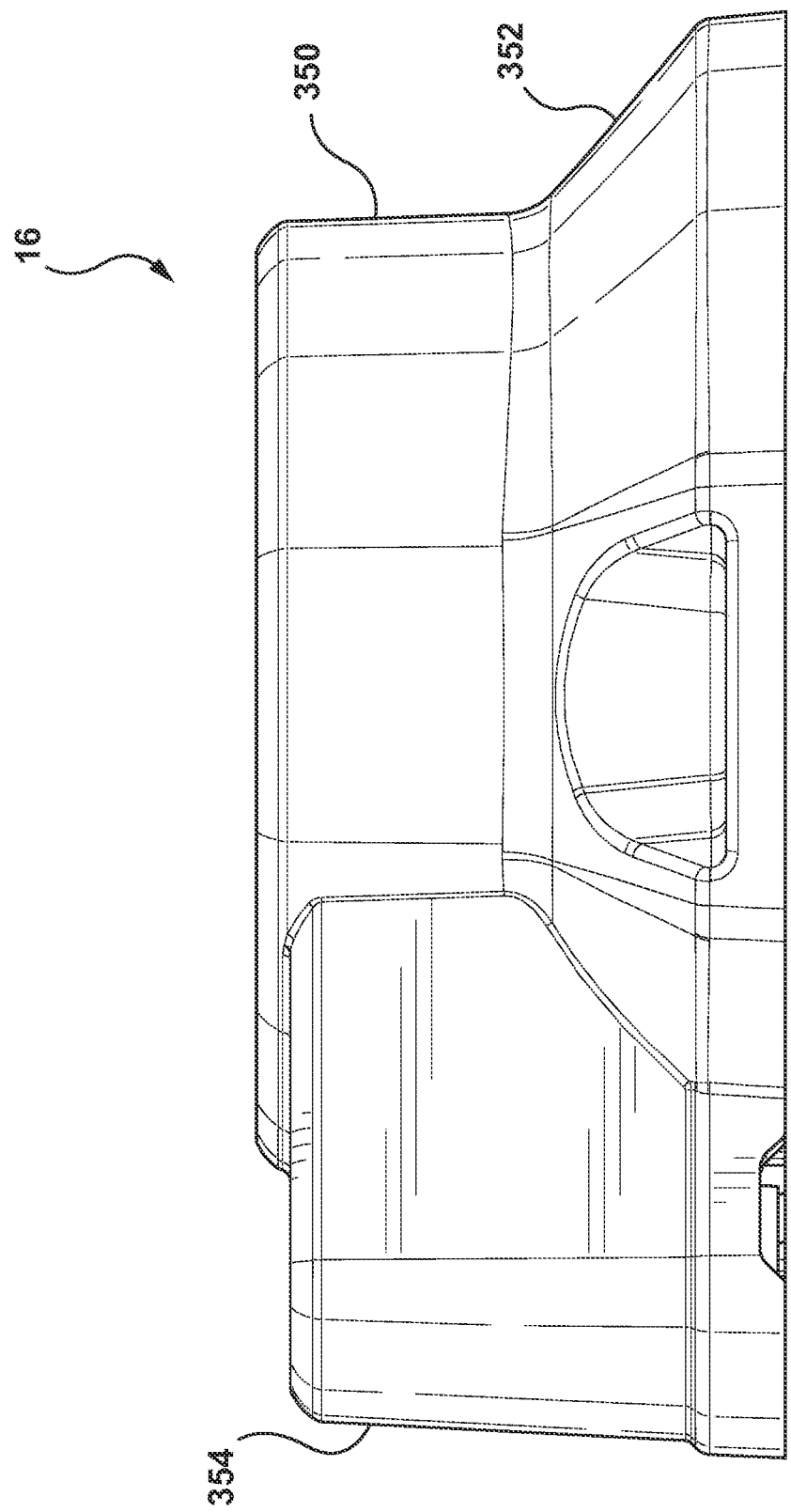
FIG. 37 is a rear view of the cylinder base.
Figure 38:
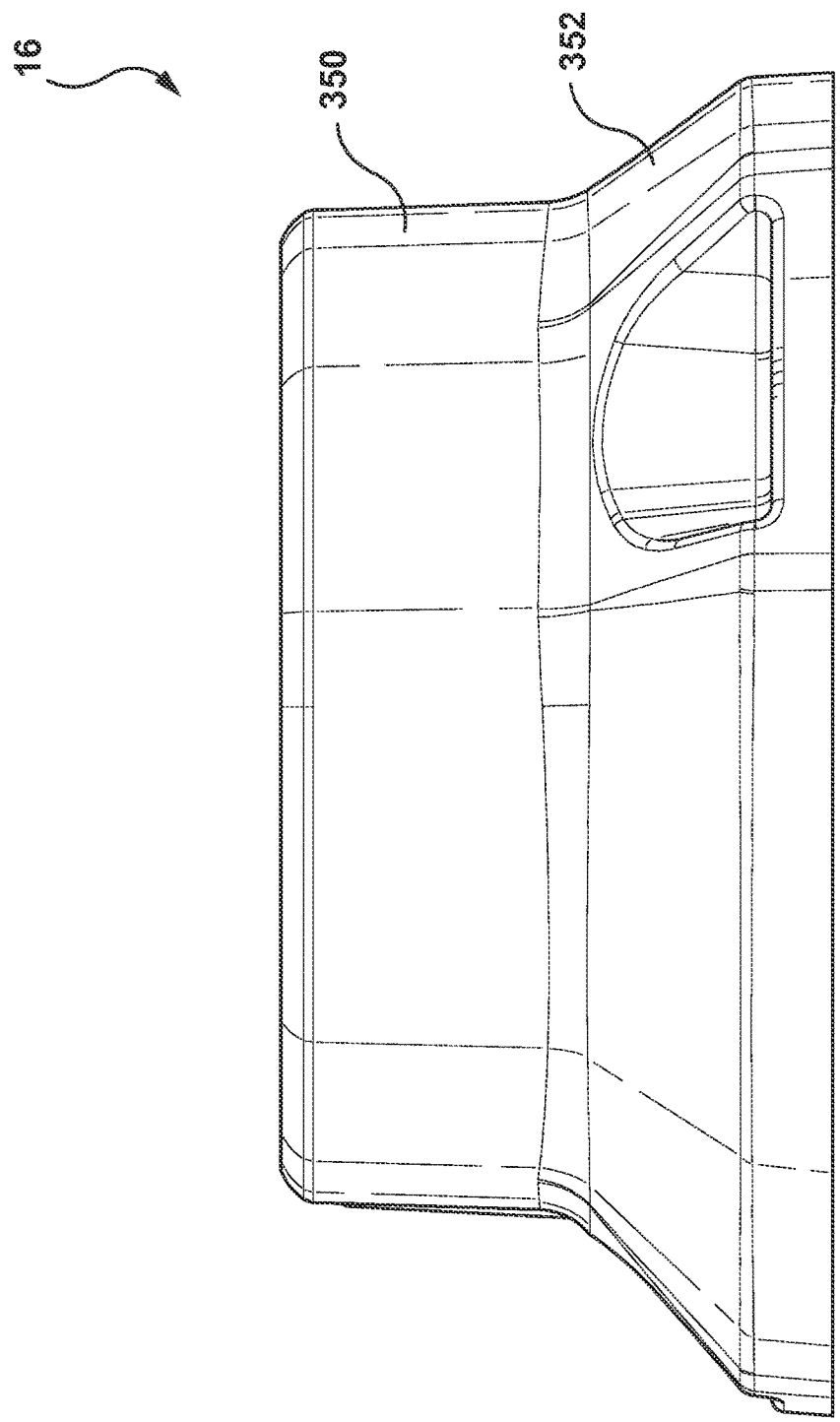
FIG. 38 is a left side view of the cylinder base.
Figure 39:
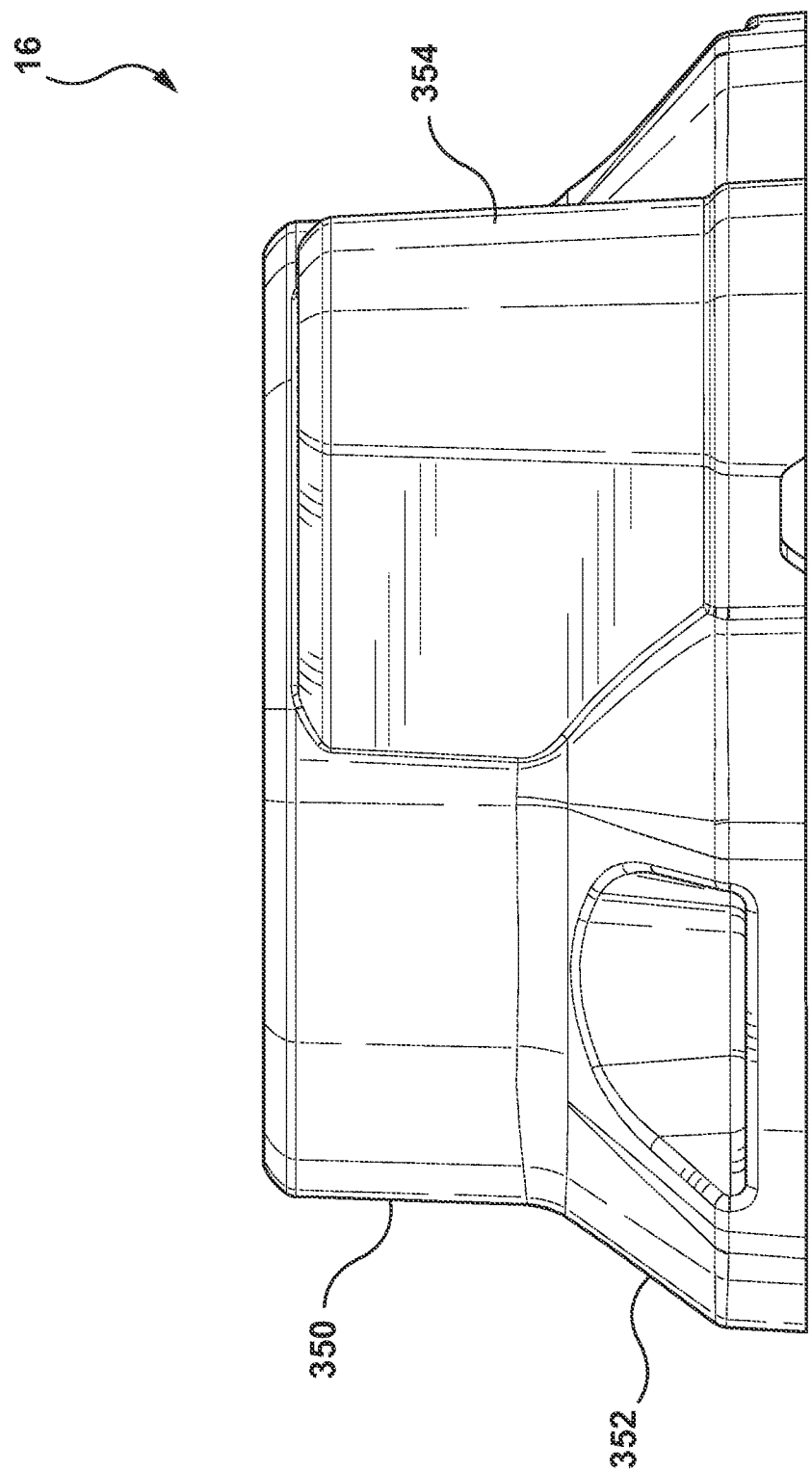
FIG. 39 is a right side view of the cylinder base.
Figure 40:
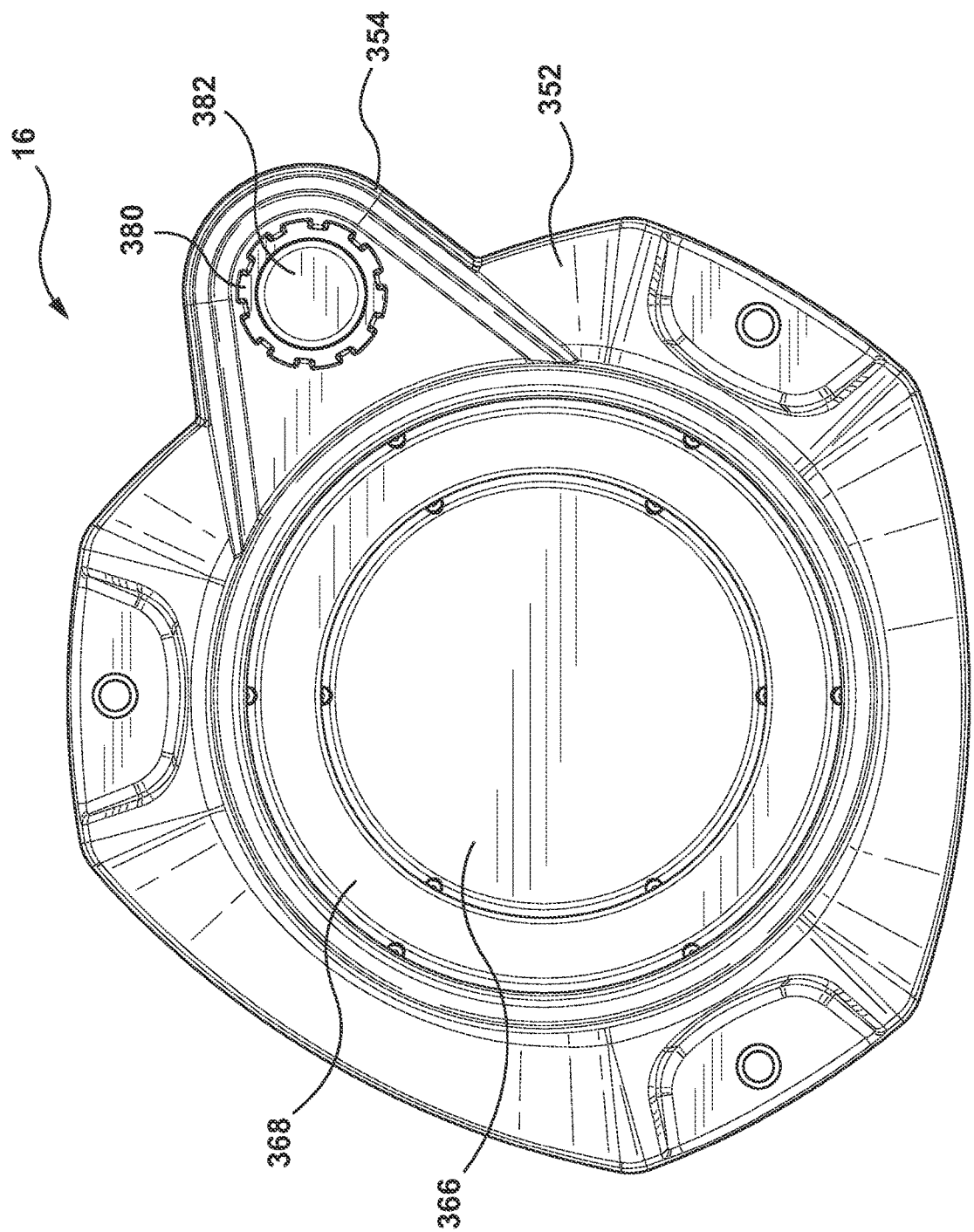
FIG. 40 is a top view of the cylinder base.

Referring additionally to FIGS. 32-33, the second ramp member 242 includes a first portion 310, a top of which is abutted by the bottom of the body 270, and a second portion 312 extending upward from the first portion 310. The first portion 310 includes a cut-out 314 through which the crimp sleeve 218 extends, and first and second indicia 316 and 318. The first and second indicia 316 and 318, for example the words ON and OFF, are used in conjunction with indicia 320 on the knob 234, for example an arrow, to indicate whether the regulator is on or off. If the arrow 320 is pointing to the word ON 316, then the regulator is open and fuel flows from the cylinder 14, through the regulator 18 and to the conduit 20. If the arrow 320 is pointing to the word OFF 318, then the regulator is closed and fuel is not flowing through the regulator 18.

The second portion 312 includes the slots 280, an opening 322 through which the fastener 244 extends, and a pair of lower ramps 324 and 326 at a top of the second portion 312. The lower ramps 324 and 326 may be diametrically opposed ramps each having an upper portion 328, 330 and a lower portion 332, 334. The lower ramps 324 and 326 curve along the upper surface of the second portion 312 and downward from the upper portions 328 and 330 to the lower portions 332 and 334. When the first and second ramp members 240 and 242 are connected, the upper ramps 282 and 284 are positioned above the lower ramps 324 and 326 respectively such that the projections 266 are held by and guided between the respective pairings of upper ramps 282 and 284 and lower ramps 324 and 326. The interaction of the upper ramps 282 and 284, the lower ramps 324 and 326, and the projections 266 provide a cam system that allows for opening and closing of the regulator 18 without turning the knob 234 a full turn, for example by turning the knob a quarter turn.

During operation, the user moves the regulator 18 from the closed position to the open position. In the closed position, the arrow 320 on the knob 234 is above and pointing toward the OFF indicia 318, providing a visual indication that the regulator 18 is off or closed. To move the regulator 18 from the closed position to the open position, the user rotates the knob 234 relative to the first and second ramp members 240 and 242. Rotation of the knob 234 effects rotation of the guide member 232 due to the connection of the knob 234 and the guide member 232. The rotation of the guide member 232 rotates the projections 266 along the lower ramps 324 and 326 from the upper portions 328 and 330 downward to the lower portions 332 and 334. As the guide member 232 moves downward relative to the first and second ramp members 240 and 242, the guide member 232 moves the piston 224 downward compressing the spring 222, which moves the valve assembly 212 from a closed position to an open position allowing fuel to flow through the needle 214 into the passage 208 and through the hose barb 216 to the conduit 20. When the projections 266 are at the lower portions 332 and 334 of the lower ramps 324 and 326, the arrow 320 on the knob 234 is above and pointing toward the ON indicia 316, providing a visual indication that the regulator is on or open.

Turning now to FIGS. 34-41, an exemplary cylinder base is illustrated at reference numeral 16. The cylinder base 16 is configured to rest on a surface, such as a table or floor and to support the cylinder 14. The cylinder base 16 includes a sidewall 350, a lower wall 352 extending downward from the sidewall 350, and a torch support 354 extending to a side of the sidewall 350. In an embodiment the torch support 354 may be separable from the sidewall 350 or they may be provided as separate components.

The sidewall 350 has a cavity 356 having a first diameter portion 358 for supporting the cylinder 14 having a first diameter as shown in FIG. 1, and a second diameter portion 360 above the first diameter portion 358 and larger than the first diameter portion 358 for supporting a cylinder having a second diameter greater than the diameter of the cylinder 14. For example, the first diameter portion 358 may support a fourteen ounce cylinder and the second diameter portion 360 may support a sixteen ounce cylinder. The first and second diameter portions 358 and 360 each include respective ribs 362 and 364 to prevent or reduce rotation of the cylinder and to create an interference fit between the first and second diameter portions 358 and 360 and the respective cylinder. A bottom 366 of the cylinder base 16 serves as a support for the bottom of the cylinder 14 and a ledge 368 extending radially inward from a bottom of the second diameter portion 360 serves as a support for the bottom of the cylinder having the second diameter greater than the diameter of the cylinder 14.

The cylinder base 16 includes one or more recesses 370, and as illustrated three recesses 370 in the lower wall 352. Each recess 370 includes an opening 372 extending through the bottom 366 of the base 16 through which a suitable fastener can extend to secure the cylinder base 16 to the surface, such as the floor or table. Each recess 370 also includes a base 374 for receiving a suitable clamp to clamp the cylinder base 16 to the surface, such as to the table. One or more feet may be provided on the bottom 366 to the cylinder base 16, for example non-slip feet to prevent or reduce movement of the cylinder base 16 when not attached to the surface.

The torch support 354 has a cavity 380 that receives a tube 382, for example a stainless steel tube. An upper edge of the cavity 380 defines an interlock mechanism 384 for engaging with a corresponding interlock mechanism 386 on the head 52. In an embodiment, the interlock mechanism 384 and 386 may be in the form of crenellations. For example, the interlock mechanism 384 includes a plurality of circumferentially spaced merlons 388 that alternate with a plurality of circumferentially spaced crenels 390 to mate with corresponding crenels 392 and merlons 394 that are circumferentially spaced and alternate around the head 52. When the user wants to store or set down the torch 12, the user inserts the burn tube 54 into the tube 382 and engages the interlock mechanisms 384 and 386. If the torch 12 is placed in the tube 382 while on, the stainless steel tube 382 can snuff out the flame. In an embodiment, the trigger 62 of the torch 12 can turn off when the flame is snuffed out. In another embodiment, a detector can be provided to detect the presence of gas in the tube 282 and shut off the torch 12 and/or the regulator 18.

The aforementioned systems, components, (e.g., torch, regulator, base, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A torch including:
   a body having a top surface, a bottom surface, a left side, and a right side, and a first portion and a second portion angled relative to the first portion, the first and second portions having top surfaces adjacent to each other and defined by the top surface of the body, bottom surfaces adjacent to each other and defined by the bottom surface of the body, and sides corresponding to the left and right sides of the body;
   a control knob on the top surface of the second portion for adjusting a flow of fuel through the torch;
   a trigger on the top surface of the first portion that is movable from an off position to an on position to actuate an igniter, the trigger including a trigger body and a deflectable tab fixedly projecting from a front of the trigger body, the deflectable tab having a catch extending upward toward the top surface of the first portion for engaging a ledge in the body to lock the trigger in the on position;
   a pivot arm coupled to the trigger and pivotable about a pivot in the first portion;
   a seesaw disposed in the first portion and pivotable about another pivot in the first portion, the seesaw having a first arm that slidably engages the pivot arm to effect movement of the seesaw; and
   a burn tube extending from an end of the second portion away from the first and second portions.

2. The torch according to claim 1, further including a first valve assembly disposed within the second portion and coupled to the control knob, and a second valve assembly fluidly coupled to the first valve assembly and disposed within the first portion to be opened when the trigger moves from the off position to the on position.

3. The torch according to claim 2, wherein the control knob is adjustable to adjust a length of a flame without extinguishing the flame by effecting a ninety-degree turn of the first valve assembly.

4. The torch according to claim 2, the seesaw further comprising a second arm opposite the first arm that engages the second valve assembly, wherein movement of the trigger from the off position to the on position effects movement of the pivot arm to pivot the seesaw about the another pivot to engage the second arm and the second valve assembly to open the second valve assembly.

5. The torch according to claim 2, further including a nozzle and flame guide within the burn tube, the nozzle being fluidly coupled to the first valve assembly and including an orifice through which fuel flows to mix with air from venturi ports in the flame guide.

6. The torch according to claim 5, wherein the orifice is between nine hundredths of a millimeter in diameter and thirteen hundredths of a millimeter in diameter.

7. The torch according to claim 5, wherein the flame guide includes two venturi ports.

8. The torch according to claim 5, further including a tip coupled to the flame guide and spaced from an end of the burn tube, and a flame holder surrounding the tip and extending past the tip proximate the end of the burn tube.

9. The torch according to claim 8, wherein the flame holder is a ceramic flame holder.

10. A torch including:
a body having a first portion having a top surface and a second portion angled relative to the first portion and having a top surface adjacent the top surface of the first portion, the top surface of the first portion and the top surface of the second portion defining a top surface of the body;
a control knob on the top surface of the second portion for adjusting a flow of fuel through the torch;
a trigger on the top surface of the first portion that is movable from an off position to an on position to actuate an igniter; and
a burn tube extending from an end of the second portion away from the first and second portions,
wherein the trigger includes a trigger body and a deflectable tab fixedly projecting from a front of the trigger body, the deflectable tab having a catch extending upward toward the top surface of the first portion for engaging a ledge in the body to lock the trigger in the on position.

11. The torch according to claim 10, wherein the trigger additionally includes a pair of projections projecting outwardly from opposite sides of the trigger body, the projections configured to move downward toward a bottom of the body and forward toward the burn tube within respective channels formed on inner surfaces of the first portion.

12. The torch according to claim 1, wherein the second portion is angled relative to the first portion between thirty and sixty degrees.

13. The torch assembly according to claim 1, wherein the body includes a groove at a transition between the first and second portions at bottoms therefor for a user's finger.

14. The torch assembly according to claim 1, wherein the trigger includes a trigger body, a deflectable tab projecting from a front of the body that has a catch for engaging a ledge in the body to lock the trigger in the on position, and a pair of deflectable tabs projection from sides of the body that have a catch, wherein the torch further includes a pivot arm pivotable about a pivot in the first portion, the pivot arm including a pair of slots that each receive the catch of one of the pair of deflectable tabs to couple the trigger to the pivot arm.

15. The torch according to claim 1, wherein the trigger includes a trigger body and a deflectable tab projecting from a front of the trigger body, the deflectable tab having a catch extending upward from the deflectable tab for engaging a ledge in the body to lock the trigger in the on position.

16. A torch according to claim 15, wherein the trigger additionally includes a pair of projections projecting outwardly from opposite sides of the trigger body, the projections configured to move downward toward the bottom of the body and forward toward the burn tube within respective channels formed on inner surfaces of the first portion.

17. A torch including:
a body having a top surface and a bottom surface and the body including a first portion and a second portion angled relative to the first portion, the first and second portions having tops surfaces corresponding to the top surface of the body and bottom surfaces corresponding to the bottom surface of the body, and the first and second portions each having first and second ends;
a control knob at the top surface of the second portion proximate the first end of the second portion for adjusting a flow of fuel through the torch;
a trigger at the top surface of the first portion proximate the second end of the first portion that is movable from an off position to an on position to actuate an igniter, the trigger having a trigger body, the trigger body having a deflectable tab projecting from a front of the trigger body and a pair of projections projecting outwardly from opposite sides of the trigger body, the deflectable tab having a catch extending upward from the deflectable tab for engaging a ledge in the body to lock the trigger in the on position and the projections being configured to move downward toward a bottom of the body and forward toward the second end of the first portion within respective channels formed on inner surfaces of the first portion;
a sleeve extending from and through an opening in the first end of the first portion for surrounding a conduit; and
a burn tube extending from the second end of the second portion away from the first and second portions.

* * * * *